(12) United States Patent
Kočár

(10) Patent No.: US 12,332,194 B2
(45) Date of Patent: Jun. 17, 2025

(54) DYNAMIC SPECTRAL ACQUISITION FOR MATERIAL STUDIES

(71) Applicant: FEI Company, Hillsboro, OR (US)

(72) Inventor: Darius Kočár, Portland, OR (US)

(73) Assignee: FEI Company, Hillsboro, OR (US)

( * ) Notice: Subject to any disclaimer, the term of this patent is extended or adjusted under 35 U.S.C. 154(b) by 535 days.

(21) Appl. No.: 17/558,495

(22) Filed: Dec. 21, 2021

(65) Prior Publication Data

US 2022/0205936 A1    Jun. 30, 2022

(30) Foreign Application Priority Data

Dec. 30, 2020  (EP) .................................... 20217932

(51) Int. Cl.
| | |
|---|---|
| *G01N 23/2252* | (2018.01) |
| *G06T 7/11* | (2017.01) |

(52) U.S. Cl.
CPC ............ *G01N 23/2252* (2013.01); *G06T 7/11* (2017.01); *G01N 2223/405* (2013.01); *G01N 2223/418* (2013.01); *G06T 2207/10061* (2013.01); *G06T 2207/20021* (2013.01)

(58) Field of Classification Search
CPC ........... G01N 23/2252; G01N 23/2206; G01N 2223/405; G01N 2223/418; G06T 7/11; G06T 2207/10061; G06T 2207/20021; H01J 37/00; H01J 37/02; H01J 37/22; H01J 37/222; H01J 37/26; H01J 37/28

USPC ........................................... 250/306, 307, 311
See application file for complete search history.

(56) References Cited

U.S. PATENT DOCUMENTS

| | | | |
|---|---|---|---|
| 6,731,792 B1 * | 5/2004 | Tanaka ................... | G06V 10/28 382/164 |
| 2003/0029998 A1 * | 2/2003 | Matsumoto ............. | H01J 37/28 250/306 |
| 2018/0136147 A1 * | 5/2018 | Randolph .......... | G01N 23/2257 |
| 2019/0348256 A1 * | 11/2019 | Geurts .................... | G06T 7/254 |

FOREIGN PATENT DOCUMENTS

EP    2546638    8/2019

OTHER PUBLICATIONS

EP Search Report dated Jun. 17, 2021, for EP Application No. 20217932.1, filed Dec. 30, 2020.

* cited by examiner

*Primary Examiner* — Jason L McCormack

(57) ABSTRACT

Method for determining properties of a sample and a charged particle system for implementing the method are disclosed. The method includes providing at least one image of the sample based on first emissions from a plurality of first scan locations; determining at least one or a plurality of second scan location(s) for at least one or a plurality of region(s) of the at least one image; detecting second emissions from at least one of the second scan locations of at least one of the regions; and adjusting a second dwell period with respect to an average segmentation dwell period.

21 Claims, 7 Drawing Sheets

DYNAMIC SPECTRAL ACQUISITION FOR MATERIAL STUDIES

FIELD OF THE INVENTION

The present invention relates to the field of spectroscopy and image analysis. The present invention further relates to determining properties of a sample, e.g. by means of a dynamic spectral acquisition and image segmentation, in a charged particle microscope.

BACKGROUND

Material studies that involve characterizing the properties (e.g., structure, topography and chemical composition) of probes in the micro- and nanoscopic regime, can be performed through the implementation of scanning microscope systems, such as scanning electron microscopes (SEMs). A SEM is configured to scan the surface of the sample with a primary beam (i.e., an electron beam) and acquire an image of the sample based on various types of emissions e.g., emissions of backscattered, transmitted or secondary electrons. These emissions result from the interaction of the electron beam with the particles of the sample (such as atoms). In case of mineral studies, the sample consists of many thousands of mineral grains in particles embedded in an epoxy matrix.

Backscattered electrons (BSE) originate from the primary electron beam, which, as the name suggests, are reflected back (i.e., out of the sample) via elastic scattering on the sample atoms. The number of backscattered electrons at each scan location on the sample depends on the atomic number of the chemical elements (e.g. mineral elements) located in the corresponding scan location. Thus, the brightness variations (e.g., gray-level variations) within a BSE image are indicative of the composition variations within the sample.

Along with the emissions of backscattered electrons, emissions of X-rays can also emerge from the interaction of the primary beam with the sample. In particular, characteristic X-rays are emitted when primary electrons cause the ejection of an electron in an inner shell of a sample atom, creating an electron hole. This electron hole is then filled by another electron from an outer atomic shell through the emission of an X-ray photon. The energy of that X-ray photon corresponds to the energy difference between the outer and inner shell. Thus, the emitted X-rays have energies that are unique for the corresponding chemical elements and their detection can therefore reveal the chemical composition of the sample. For the detection of X-ray emissions, SEMs are equipped with X-ray spectrometers that are configured to measure the number of detected X-rays with respect to their energies (energy-dispersive spectrometers, EDS) or their wavelengths (wavelength-dispersive spectrometers, WDS).

Material analysis (e.g., mineralogy classification) commonly involves coupling the backscattered electron imaging process with the application of X-ray spectroscopy. However, the X-ray acquisition takes a few milliseconds per scan location, while the BSE acquisition at each scan location can be three to four orders of magnitude faster. Thus, obtaining the compositional information of the entire sample based on the X-ray detection from tens or hundreds of thousands of scan locations can be highly time-consuming, lasting from several minutes to a few hours.

For this reason, a common measurement mode for material studies (e.g., mineralogy classification) that has been disclosed in the EP patent 2 546 638 B1, is to reduce the number of scan locations for the X-ray detection. This is done by acquiring a high-resolution BSE image and processing (segmenting) the image in order to identify parts (e.g., mineral grains) of the same contrast and thus the same chemical composition (e.g. mineral composition). For each identified mineral grain only one scan location is determined. The primary beam is then positioned at the scan location of each identified grain in order to detect the corresponding X-ray emissions and obtain the respective X-ray spectrum.

However, a reliable grain identification and the production of corresponding scan locations requires complex algorithms that take significant time to execute (in relation to the X-ray acquisition time). Typical BSE image segmentation time for the entire sample can be low tens of seconds, during which the SEM is completely idle.

In fact, depending on the sample and the image properties, grain segmentation might take longer per scan location than the X-ray acquisition. This is commonly the case when large mineral grains are imaged/processed with a high resolution and/or magnification. Such big volumes of data are proving to be challenging for current segmentation algorithms and require more computational time to solve.

An example of a current solution is to apply a fast and simple algorithm that finishes the segmentation sooner. However, Applicant recognizes that this can lead to a problem called over-segmentation, which involves determining more than one scan location for each mineral grain, creating that way misidentified mineral grains. As a result, this can cause additional post-processing overhead, during which the scan locations of each grain are merged into one scan location. Furthermore, the post-processing step may not be able to merge all misidentified grains. This in turn can result to an over-acquisition of misidentified grains during the X-ray acquisition phase, thus increasing the total acquisition time.

Another current solution is to constantly scan the beam over the sample, during which X-rays are continuously collected from arbitrary locations. Applicant recognizes that while that modality is suitable for interactive work, it is not suitable for an automated and unattended data acquisition, because there are no clearly defined criteria for deciding when to stop measuring a sample. Consequently, it would take a longer time to obtain a suitable X-ray spectrum for a confident material or mineral identification using this approach.

SUMMARY

In one embodiment, a system configured for material analysis and mineralogy, comprising a scanning microscope system, the scanning microscope system comprises a first detector and a second detector, and further comprising a data-processing system, the data-processing system (800) comprising a data-storage component, a segmentation component and a dwell period adjustment component, wherein the data-storage component is configured for providing at least one image of a sample based on first emissions from a plurality of first scan locations, wherein the segmentation component is configured for determining at least one or a plurality of second scan locations for at least one or a plurality of region(s) of the at least one image, wherein the second detector is configured for detecting second emissions from at least one of the second scan locations of at least one of the regions, wherein the dwell period adjustment component is configured for adjusting a second dwell period with respect to an average segmentation dwell period.

In another embodiment, a method for determining properties of a sample, comprises: performing an image providing step, comprising providing at least one image of the sample based on first emissions from a plurality of first scan locations; performing a segmentation step, comprising determining at least one or a plurality of second scan location(s) for at least one or a plurality of regions of the at least one image; performing a detection step, comprising detecting second emissions from at least one of the second scan locations of at least one of the regions; and performing a dwell period adjustment step, comprising adjusting a second dwell period with respect to an average segmentation dwell period.

DETAILED DESCRIPTION

Figure 1:
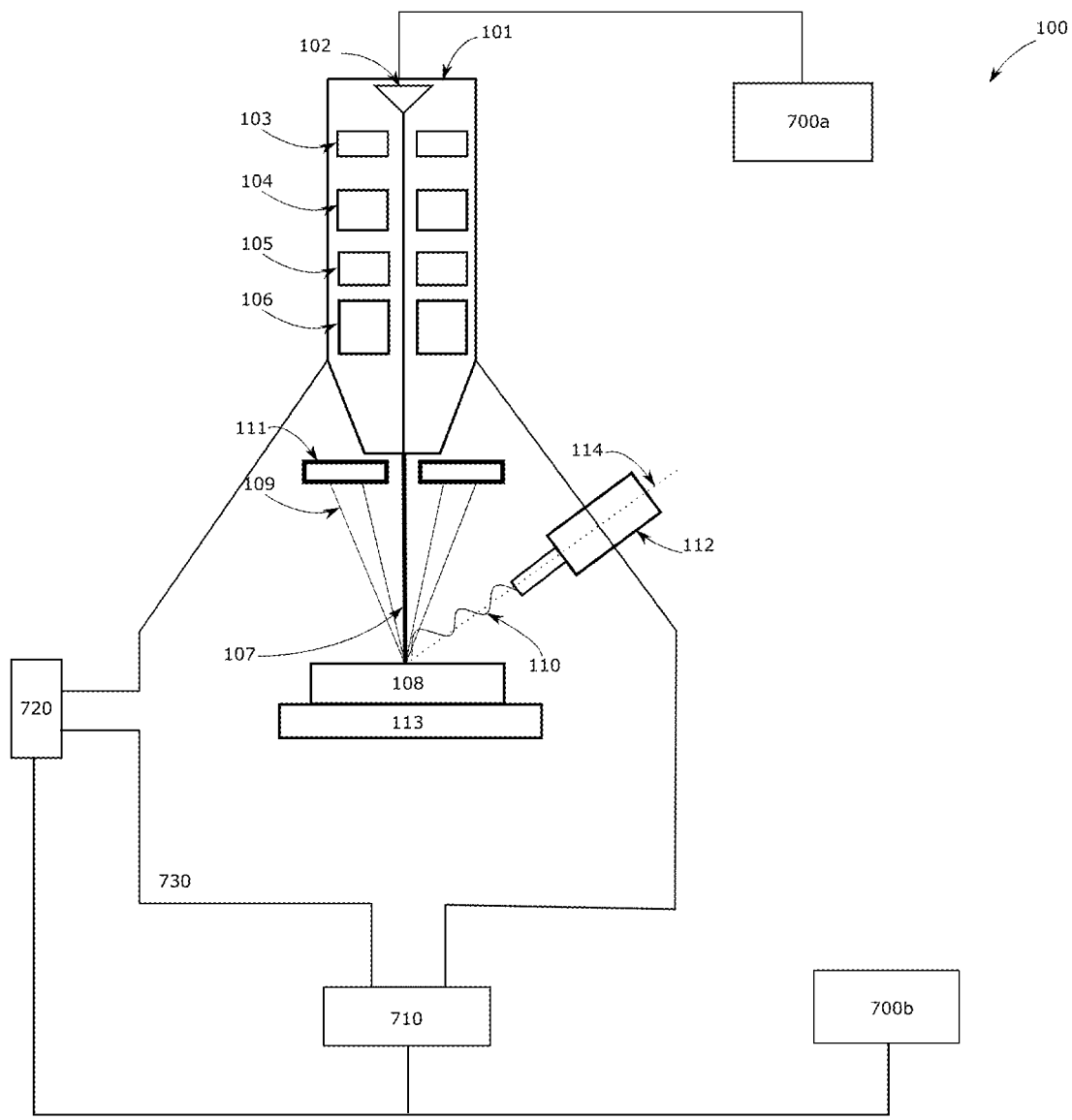
FIG. 1 shows a scanning microscope system.

The present invention seeks to overcome or at least alleviate the shortcomings and disadvantages of the prior art. More particularly, it is an object of the present invention to provide an improved method, system and computer program product for material and mineralogy analysis.

It is an optional object of the invention to provide a system and method for determining the properties (such as chemical composition and topography) of a sample. Particularly, it is an optional object of the present invention to allow for an adjustable X-ray acquisition and image segmentation. It is another optional object of the invention to allow for a parallel implementation of the X-ray acquisition and image segmentation.

In a first embodiment, a system comprising a scanning microscope system and a data-processing system is disclosed. The system can be configured for providing at least one image of a sample based on first emissions from a plurality of first scan locations. Further, the system can be configured for determining at least one or a plurality of second scan location(s) for at least one or a plurality of region(s) of the at least one image. Moreover, the system can be configured for detecting second emissions from at least one of the second scan locations of at least one of the regions. Moreover, the system can be also configured for adjusting a second dwell period with respect to an average segmentation dwell period.

The term "image" is intended to comprise a two-dimensional grid, wherein the two-dimensional grid can comprise at least one or a plurality of portions. Each portion is characterized by its coordinates and its value (color and/or intensity). Thus, the image may refer to a visual representation of the sample in gray level variations and/or color variations and/or intensity variations. Further, each portion in the image may correspond to a point (e.g. scan point) on the sample. The image portions may for example be pixels or comprise a plurality of pixels.

Furthermore, the term "mask" is intended to comprise a binary image, comprising for example black and white portions. The portions of the one color and/or intensity (e.g. white portions) may be used for marking a section of the image for further processing. However, the term mask may also refer to the marked section of the image (e.g. white portions).

The term "spectrum" is intended to comprise a distribution function of a physical quantity (e.g. energy or frequency). A quantity measure may be for example the intensity, the abundance, the rate, or the flux of the respective quantity value. The spectrum may refer to a discrete spectrum, wherein the discrete spectrum may comprise a set of discrete spectral lines at different energy values. The peak of each spectral line at the corresponding line center may correspond to the maximum number of detected photons (i.e. peak intensity) over the corresponding line width. The detected photons may further refer to detected X-ray photons. Each spectral line may correspond to an electronic transition of a chemical element, wherein the energy value of each electronic transition may be unique for the corresponding chemical element. The spectrum may also refer to a continuous spectrum, wherein the continuous spectrum may refer to an intensity distribution over a range of continuous energy values. However, the intensity may also be plotted with respect to the corresponding wavelengths, frequencies or wavenumbers.

The term "particle" is intended to comprise a particle in the sample. The particles may correspond to regions. The term "region" may refer to a region of the sample corresponding to a particle or a portion thereof, e.g. when only a section of the sample is imaged and/or processed, whose section only comprises a portion of a particle. The term "region" may also refer to a portion of the image, whose portion corresponds to a particle in the sample.

The term "mineral grain" is intended to comprise a mineral grain within a particle located in the sample. The mineral grains may correspond to parts. The term "part" may refer to a part of the particle corresponding to a mineral grain or a portion thereof, e.g. when only a section of the particle is imaged and/or processed, whose section only comprises a portion of a mineral grain. The term "part" may also refer to a portion of the image, whose portion corresponds to a mineral grain within the particle located in the sample.

Whenever x-, y- and/or z-coordinates or directions are used within this disclosure, the z-direction may be vertical, in other words orthogonal to a ground surface. The x- and y-directions may be orthogonal to each other and to the z-direction, i.e. they may be horizontal directions. The coordinates may form a Cartesian coordinate system.

The term "scan location" is intended to comprise a location of a scan point in the sample. The location is given by (x,y)-coordinates with respect to an internal coordinate system of the sample and/or the image.

Moreover, the terms "second scan location(s)", "region(s)" will be used together with the plural form of a verb for reasons of clarity and conciseness. However, these statements are intended to also cover at least one second scan location and at least one region.

In this disclosure, the term "time interval" is intended to comprise a period of time defined between two fixed times/events. The person in the skilled art will easily understand that two time intervals defined by the limits (t1, t2) and (t1', t2') with t1≤t1' and of the length w and w' respectively, are overlapping if the following condition is fulfilled: w+w'>t2'−t1.

The term "data set" is intended to comprise a collection of data. The term "data set" may also refer to a list of the (x,y)-coordinates of the corresponding second scan location(s).

The scanning microscope system may comprise a first detector, wherein the first detector may be configured for detecting the first emissions from the first scan locations.

The first detector may comprise a backscattered electron detector.

The scanning microscope system may comprise a second detector, wherein the second detector may be configured for detecting the second emissions from the second scan location(s).

The second detector may comprise an X-ray detector.

The scanning microscope system may be configured for focusing a beam of charged particles (such as electrons) to a scan point on the sample.

The scanning microscope system may further be configured for scanning the beam of charged particles over a plurality of scan locations in one or two dimensions.

The scan locations may correspond to the first scan locations.

The scan locations may correspond to the second scan locations.

The data-processing system may be configured for assigning a two-dimensional coordinate system to the sample.

The data-processing system may also be configured for assigning the two-dimensional coordinate system of the sample to the at least one image.

Thus, the location of each portion in the image may be tracked as the beam of charged particles moves across the first scan locations of the sample.

Assigning the same coordinate system of the sample to the image may be accomplished by means of reference points of known coordinates, wherein the reference points may be incorporated in the sample or a movable stage.

A result of scanning the beam of charged particles over the scan locations of the sample may comprise an interaction of the beam with the sample.

A result of the interaction may comprise the first and/or the second emissions.

The first emissions may comprise emissions of particles (such as backscattered electrons).

The second emissions may comprise emissions of photons (such as X-rays).

The image may correspond to a backscattered electron image.

The data-processing system may be configured for storing the detected backscattered electron data point-by-point in the respective portion of the image. Thus, the intensity of each portion may depend on the number of backscattered electrons detected at the respective scan point.

The data-processing system may be configured for generating the at least one image based on the stored backscattered electron data.

The at least one image may show contrast between the regions (or parts thereof) with different properties (such as chemical compositions). The contrast may comprise gray level variations and/or a black and white contrast.

Each region of the at least one image may correspond to a particle in the sample, wherein each particle in the sample may comprise at least one or a plurality of mineral grain(s).

The scanning microscope system, particularly the first detector, may be configured for detecting the first emissions for the duration time of a first dwell period at each first scan location.

The scanning microscope system, particularly the second detector, may be configured for detecting the second emissions for the duration time of the second dwell period at each second scan location.

The second dwell period may be longer than the first dwell period. For example, the second dwell period may correspond to 10 ms, while the first dwell period may correspond to 1 µs.

The system may be configured for detecting the first emissions from the first scan locations and detecting the second emissions from the second scan location(s) at different time intervals, wherein the different time intervals correspond to non-overlapping time intervals.

The data-processing system may comprise a data-storage component, wherein the data-storage component may be configured for providing the at least one image of the sample.

The data-processing system may comprise a segmentation component, wherein the segmentation component may be configured for determining the second scan location(s) for the region(s) of the at least one image.

The segmentation component may further be configured for determining each second scan location for the duration time of a segmentation dwell period.

The segmentation dwell period may depend on image properties, such as the resolution and the magnification of the at least one image.

The segmentation dwell period may also depend on the size of the mineral grain(s) and/or particle(s). Typical grain sizes may range from at least 1 µm to at most 500 µm.

Sample statistics, such as particle size, grain number per particle and size distribution over the sample, have low statistical spread throughout the same sample and/or a replicant sample. Thus, this may lead to low variations of the segmentation dwell period from one second scan location to another.

The segmentation dwell period may be shorter than or equal to the second dwell period. For example, the segmentation dwell period may correspond on average to 3 ms and the second dwell period may correspond to 10 ms.

However, in this example the segmentation dwell period may be longer than the second dwell period. This may be the case when the image (and/or sections thereof) is highly resolved and/or magnified and/or the size of the grains is considerable.

Generally, the resolution and the magnification of the at least one image may define the size of a portion (such as a pixel), ranging from at least 10 nm to at most 1000 nm. For example, a small portion size of 10 nm may be indicative of a high resolution and/or a high magnification. A smaller portion size may result to a higher number of portions representing the same part of the image (relating to a mineral grain).

In fact, the segmentation dwell period may be slower with an increasing number of portions. For example, if a mineral grain of a medium size (such as 50 µm) is imaged with a high resolution and/or a high magnification (e.g. portion size of 20 nm) the resulting segmentation dwell period may be very long (e.g. a factor of 10 longer than the second dwell period).

Thus, the system may further comprise a dwell period adjustment component.

The dwell period adjustment component may be configured for adjusting the second dwell period with respect to the average segmentation dwell period.

In particular, the dwell period adjustment component may be configured for determining the average segmentation dwell period based on sample statistics.

Determining the average segmentation dwell period may comprise estimating an average time for determining each of the second scan locations of at least some preceding mineral grains and/or particles.

Further, the dwell period adjustment component may be configured for determining/obtaining the sample statistics based on measurements on the at least some preceding mineral grains and/or particles of the sample.

The sample statistics may comprise statistical information of the sample properties, such as the particle size and/or the grain number per particle and/or the size distribution of the at least some preceding mineral grains and/or particles over the sample.

The dwell period adjustment component may be configured for generating an adjusted second dwell period, wherein the adjusted second dwell period may be equal to the average segmentation dwell period.

The data-processing system may comprise a pre-processing component.

The pre-processing component may be configured for applying a thresholding algorithm.

In particular the thresholding algorithm may be configured for separating the at least one image into a background part and a foreground part based on a threshold intensity.

The background part may comprise background portions, wherein the background portions (e.g. pixels) may comprise intensities lower than the threshold intensity (e.g. dark gray and/or black portions).

The foreground part may comprise foreground portions, wherein the foreground portions (e.g. pixels) may comprise intensities higher than or equal to the threshold intensity (e.g. bright gray and/or white portions).

Delimiting/removing the background part may comprise assigning to the background portions the same color value and/or intensity value (e.g. black portions).

The foreground part may comprise at least some of the regions of the image.

Further, the pre-processing component may be configured for determining the boundaries of the corresponding regions of the at least one image by means of a contouring algorithm.

The contouring algorithm may be configured for joining adjacent portions along the boundaries of the corresponding regions to curves.

The adjacent portions along the boundaries of the corresponding regions may be surrounded by the background portions (e.g. black portions).

The pre-processing component may be further configured for applying a bounding box algorithm.

The bounding box algorithm may be configured for dividing the at least one image into at least two or a plurality of sub-images based on a result of the contouring algorithm.

A sub-image of the at least one image may be delimiting one region.

The segmentation component may be configured for correcting a sub-image generation error.

The sub-image generation error may comprise generating at least one sub-image containing at least two neighboring regions.

The at least two neighboring regions located within the one sub-image may correspond to touching particles in the sample.

At least one or more portions along the boundary of one of the neighboring regions may be contiguous with at least one or more portions along the boundary of another of the neighboring regions.

Correcting the sub-image generation error may comprise processing each of the neighboring regions within the one sub-image individually.

Further, the segmentation component may be configured for processing the at least two sub-images individually.

The segmentation component may also be configured for determining the second scan locations for the at least two sub-images.

In particular, the segmentation component may be configured for assigning contiguous portions of parts of the corresponding regions within the respective sub-images to clusters by means of a k-means clustering algorithm.

Thus, each region of the respective sub-image may comprise at least one or a plurality of clusters.

The segmentation component may further be configured for applying a flood fill algorithm, wherein the flood fill algorithm may be configured for generating a mask for at least one of the clusters.

Generating the mask for the at least one of the clusters may comprise assigning to contiguous portions within the corresponding cluster the same value of color and/or intensity.

Each mask may be delimiting a part of the corresponding region.

A part within each region of the at least one image may correspond to a mineral grain within the corresponding particle in the sample.

The segmentation component may further be configured for determining one second scan location for each mask.

Each second scan location may correspond to a centroid of the respective mask.

The data-processing system may be configured for generating data sets for the corresponding regions within the respective sub-images.

A data set may comprise a list of the coordinates of the second scan location(s) relating to one of the regions.

The data-storage component may be configured for providing at least one of the data sets.

The scanning microscope system may be configured for focusing the beam on at least one of the second scan locations of the at least one of the data sets.

The second detector may be configured for detecting the second emissions emerging from the corresponding second scan location(s) upon irradiation of the sample with the beam.

The segmentation component may be configured for processing the at least two or more sub-images for the duration of a first time interval. The first time interval may correspond to a difference between an initial time and a final time. The initial time may correspond to the time at which the segmentation component determines the first of the second scan location(s) of the first of the sub-images. The final time may correspond to the time at which the segmentation component determines the last of the second scan location(s) of the last of the sub-images.

Moreover, the scanning microscope system may be configured for focusing the beam on the second scan location(s) of the corresponding data set(s) and detecting the corresponding second emissions for the duration of a second time interval. The second time interval may correspond to a difference between another initial time and another final time. The other initial time may correspond to the time at which the second detector detects the second emissions from the first of the second scan location(s) of the first of the data sets. The other final time may correspond to the time at which the second detector detects the second emissions from the last of the second scan location(s) of the last of the data sets (relating to the last sub-image).

The first time interval and the second time interval may overlap. In this example, the system may be configured for detecting the second emissions from the second scan location(s) within the data set of one sub-image (sequentially), while at the same time selecting another sub-image and determining another set of second scan locations (sequentially). The system may be configured for repeating the process until all of the sub-images have been selected and processed.

Thus, the parallel implementation of the segmentation and the detection process may allow to reduce the overall acquisition time by several factors and by a factor of at least 1.2, preferably by a factor of at least 1.4 and even more preferably by a factor of at least 2.

Furthermore, the disclosed system may be optionally advantageous, as it may allow setting the segmentation dwell period to be on average equal to the second dwell period and thus achieving a maximum overlap (more than 99%) between the first time interval and the second time interval. Since the detection of the second emissions (e.g. X-rays) is the time-limiting factor, the segmentation may take the same time as the detection of the second emissions at each second scan location with no negative impact on overall acquisition speed and/or accuracy.

In fact, allocating more time for the segmentation may allow the implementation of a complex segmentation component (e.g. algorithm) that requires more computational time. Thus, this may enable the system and the corresponding method to provide more accurate (i.e. less over-segmented) results.

Further, the parallel operation of the segmentation component (computational resource) and the scanning microscope system (instrumentational resource) may be optionally advantageous, as it may allow to increase the total resource utilization of the system.

However, in this example the segmentation dwell period may be longer than the second dwell period for each second scan location, as mentioned above. Thus, the total amount of time for determining the second scan locations of the first of the sub-images may be longer than the total amount of time for detecting the X-rays from the respective second scan locations.

As a result, the X-ray acquisition may remain idle for a certain period of time till it can be applied to the second of the sub-images, i.e. the second data set of second scan locations. Thus, the person skilled in the art will easily understand that the second time interval (as defined above) may comprise time sections in which the system may not be performing the X-ray detection.

The system may further be configured for gathering statistical data (as mentioned above) and thus estimating the average time needed to generate one second scan location. In fact, the system may be configured for updating the resulting average segmentation dwell period for every (new) second scan location. Once the system has a significant amount of data, the dwell period adjustment component is configured for dynamically increasing the second dwell period for every second scan location of the following sub-images until it matches the average segmentation dwell period. Thus, the second dwell period may be matching 100% to the average segmentation dwell period after a certain number of preceding mineral grains and/or particles. Thus, optionally advantageously, the X-ray detection may no longer be idle and may be applied with no delay to the upcoming sub-images.

Since the dwell period adjustment component is configured for increasing the second dwell period, the number of X-ray photons detected at every second scan location is increased as well. Consequently, the disclosed system is preferably advantageous as it allows for a more precise reconstruction of each spectrum, thus leading to a higher accuracy/confidence in mineral classification. This in turn may lead to a reduction of the sampled area and thus to a higher overall acquisition throughput.

The data-processing system may further comprise a post-processing component.

The post-processing component may be configured for correcting a segmentation error.

The segmentation error may comprise determining more than one second scan location for at least one of the masks.

The post-processing component may be configured for merging the second scan locations for the corresponding mask into one second scan location by means of a merging operator.

As mentioned above, setting the segmentation dwell period to be on average equal to the second dwell period may comprise providing less over-segmented results.

Thus, optionally advantageously, this may reduce the post-processing overhead in merging over-segmented grains.

The post-processing component may be configured for generating at least one spectrum based on the second emissions from the at least one of the second scan locations of the at least one of the regions.

The data-storage component may further be configured for providing the at least one spectrum.

The at least one spectrum may correspond to an X-ray spectrum, wherein the X-ray spectrum may comprise the number of detected X-ray photons (i.e. intensity) at the respective energies.

In other words, the X-ray spectrum may comprise at least one or a plurality of spectral lines at different energy values. Moreover, each spectral line may comprise a line width, thus being distributed over a range of energy values rather than being located at a single energy value. Thus, different spectral lines relating to the same element and/or different elements may overlap.

The peak of each spectral line at the corresponding line center may correspond to the maximum number of detected X-ray photons (i.e. peak intensity) over the corresponding line width.

Each spectral line may correspond to an electronic transition of a chemical element (such as silicon, iron, etc.), wherein the line center of a spectral line may correspond to the energy value of the respective electronic transition. The energy values of the electronic transitions may be unique for the corresponding chemical element.

Further, the spectral lines of the X-ray spectrum may relate to at least one or a plurality of chemical elements.

Thus, optionally advantageously, the X-ray spectrum may comprise information about the chemical composition (e.g. mineral composition) of the corresponding second scan locations relating to the respective mineral grains.

The data-processing system, particularly the post-processing component, may be further configured for performing a spectral analysis step, wherein the spectral analysis step may comprise analyzing the at least one spectrum.

Analyzing the spectrum may comprise comparing the at least one spectrum with at least one or a plurality of reference spectra.

Each reference spectrum may comprise a plurality of pre-defined spectral lines relating to one of the chemical elements (e.g. mineral elements). The chemical element(s) may be expected to be detected and/or has already been detected in other samples comprising mineral grains.

Thus, optionally advantageously, the post-processing component may be configured for assigning the spectral line(s) of the spectrum to the chemical element(s) based on a result of the spectral analysis step. This may be optionally advantageous, as it may allow the system to determine the chemical composition (e.g. mineral composition) of the corresponding mineral grain(s).

The system may be a system for material analysis and mineralogy.

The sample may comprise a plurality of particles embedded in an epoxy matrix.

The scan point may comprise dimensions of at most a micron, preferably at most 100 nm.

The system may further comprise a control unit, wherein the control unit may be configured for controlling the power supply and the operation of some of the components of the scanning microscope system, such as a condensing lens, an objective lens and a scanning coil and the movable stage.

The system may further comprise a vacuum system, wherein the vacuum system may comprise a vacuum controller, a mechanical pumping system, an ultra-high vacuum pump and a vacuum chamber. The vacuum controller may be configured for controlling the operation of the mechanical pumping system and the ultra-high vacuum pump.

The mechanical pumping system and the ultra-high vacuum pump may be configured for providing an ultra-high vacuum within the vacuum chamber.

The vacuum chamber may be configured for containing the sample, the movable stage, the first detector, the second detector or parts thereof, and a scanning electron microscope or parts thereof.

In a second embodiment, a method is disclosed. Definitions, details and advantages discussed above in the context of the system may apply respectively.

The method comprises performing the image providing step. The image providing step comprises providing at least one image of the sample based on first emissions from a plurality of first scan locations. The method further comprises the segmentation step. The segmentation step comprises determining at least one or a plurality of second scan location(s) for at least one or a plurality of region(s) of the at least one image. The method also comprises the detection step. The detection step comprises detecting second emissions from at least one of the second scan locations of at least one of the regions. The method also comprises the dwell period adjustment step. The dwell period adjustment step comprises adjusting a second dwell period with respect to an average segmentation dwell period.

The method may further comprise the step of focusing a beam of charged particles (such as electrons) to a scan point on the sample.

The method may further comprise scanning the beam of charged particles over a plurality of scan locations in one or two dimensions.

The scan locations may correspond to the first scan locations.

The scan locations may also correspond to the second scan locations.

Further, the method may comprise assigning a two-dimensional coordinate system to the sample.

The method may also comprise assigning the two-dimensional coordinate system of the sample to the at least one image.

A result of scanning the beam of charged particles over the scan locations of the sample may comprise an interaction of the beam with the sample.

Moreover, a result of the interaction may comprise the first and/or the second emissions.

The first emissions may comprise emissions of particles (such as backscattered electrons).

The second emissions may comprise emissions of photons (such as X-rays).

The method may further comprise detecting the first emissions from each first scan location.

Moreover, the method may comprise generating the at least one image based on the first emissions detected at each first scan location.

The at least one image may correspond to a backscattered electron image.

Further, the at least one image may show contrast between the regions (or parts thereof) with different properties (such as chemical compositions).

The contrast may comprise gray level variations and/or a black and white contrast.

Each region of the at least one image may correspond to a particle in the sample.

Each particle in the sample may comprise at least one or a plurality of mineral grains.

The method may further comprise detecting the first emissions for the duration time of a first dwell period at each first scan location.

The detection step may further comprise detecting the second emissions for the duration time of the second dwell period at each second scan location.

The second dwell period may be longer than the first dwell period.

The method may further comprise detecting the first emissions and detecting the second emissions at different time intervals, wherein the different time intervals may correspond to non-overlapping time intervals.

The segmentation step may comprise determining each second scan location for the duration time of a segmentation dwell period.

The segmentation dwell period may depend on image properties, such as the resolution and the magnification of the at least one image (and/or sections thereof).

As mentioned above, the segmentation dwell period may also depend on the size of the mineral grain(s) and/or particle(s). However, the variations of the segmentation dwell period from one second scan location to another may be low within the same sample and/or a replicant sample due to a low statistical spread of the sample statistics (such as particle size and grain number per particle).

The segmentation dwell period may be longer than the second dwell period. In fact, large-sized mineral grains and/or particles that relate to parts and/or regions of the image with a large number of portions, may lead to a long segmentation dwell period (i.e. slow segmentation process with respect to the detection process).

The dwell period adjustment step may further comprise determining the average segmentation dwell period based on sample statistics.

In particular, the dwell period adjustment step may comprise determining/obtaining the sample statistics based on measurements on at least some preceding mineral grains and/or particles of the sample.

The sample statistics may comprise statistical information of the sample properties, such as the particle size and/or the grain number per particle and/or the size distribution of the at least some preceding mineral grains and/or particles over the sample.

The dwell period adjustment step may comprise generating an adjusted second dwell period, wherein the adjusted second dwell period may be equal to the average segmentation dwell period.

The method may further comprise a pre-processing step.

The pre-processing step may comprise applying a thresholding algorithm.

The thresholding algorithm may comprise separating the at least one image into a background part and a foreground part based on a threshold intensity.

The background part may comprise background portions, wherein the background portions (e.g. pixels) may comprise intensities lower than the threshold intensity (e.g. dark gray and/or black portions).

The foreground part may comprise foreground portions, wherein the foreground portions (e.g. pixels) may comprise intensities higher than or equal to the threshold intensity (e.g. bright gray and/or white portions).

The thresholding algorithm may comprise delimiting/removing the background part, wherein delimiting/removing the background part may comprise assigning to the background portions the same color value and/or intensity value (e.g. black portions).

The foreground part may comprise at least some of the regions of the image.

The pre-processing step may comprise determining the boundaries of the corresponding regions of the at least one image by means of a contouring algorithm.

The contouring algorithm may comprise joining adjacent portions along the boundaries of the corresponding regions to curves.

The adjacent portions along the boundaries of the corresponding regions may be surrounded by the background portions (e.g. black portions).

The pre-processing step may further comprise applying a bounding box algorithm, wherein the bounding box algorithm may comprise dividing the at least one image into at least two or a plurality of sub-images based on a result of the contouring algorithm.

A sub-image of the at least one image may be delimiting one region.

The segmentation step may comprise correcting a sub-image generation error.

The sub-image generation error may comprise generating at least one sub-image containing at least two neighboring regions.

The at least two neighboring regions located within the one sub-image may correspond to touching particles in the sample.

At least one or more portions along the boundary of one of the neighboring regions may be contiguous with at least one or more portions along the boundary of another of the neighboring regions.

Correcting the sub-image generation error may comprise processing each of the neighboring regions within the one sub-image individually.

The method may further comprise performing the segmentation step on the at least two sub-images individually.

The segmentation step may comprise assigning contiguous portions of parts of the corresponding regions within the respective sub-images to clusters by means of a k-means clustering algorithm.

Thus, each region of the respective sub-image may comprise at least one or a plurality of clusters.

The segmentation step may further comprise applying a flood fill algorithm, wherein the flood fill algorithm comprises generating a mask for at least one of the clusters.

Generating the mask for the at least one of the clusters may comprise assigning to contiguous portions within the corresponding cluster the same value of color and/or intensity.

Each mask may be delimiting a part of the corresponding region.

A part within each region of the at least one image may correspond to a mineral grain within the corresponding particle in the sample.

The segmentation step may further comprise determining one second scan location for each mask.

Each second scan location may correspond to a centroid of the respective mask.

The method may further comprise generating data sets for the regions within the respective sub-images.

A data set may comprise a list of the coordinates of the second scan location(s) relating to one of the regions.

The method may further comprise providing at least one of the data sets.

The detection step may comprise focusing the beam on at least one of the second scan locations of the at least one of the data sets.

The detection step may further comprise detecting the second emissions from the corresponding second scan location(s) upon irradiation of the sample with the beam.

The method may comprise performing the segmentation step for the duration of a first time interval.

The method may also comprise performing the detection step for the duration of a second time interval.

The first time interval and the second time interval may overlap.

Thus, the method may comprise performing the segmentation step and the detection step in parallel.

Furthermore, the method may comprise a post-processing step.

The post-processing step may comprise correcting a segmentation error.

The segmentation error may comprise generating more than one second scan location for at least one of the masks.

The post-processing step may comprise merging the second scan locations for the at least one of the masks into one second scan location by means of a merging operator.

The method may further comprise generating and providing at least one spectrum based on the second emissions from the at least one of the second scan locations of the at least one of the regions.

The at least one spectrum may correspond to an X-ray spectrum.

The X-ray spectrum may comprise the number of detected X-ray photons (i.e. intensity) at the respective energies.

In particular, the X-ray spectrum may comprise at least one or a plurality of spectral lines at different energy values.

Each spectral line may correspond to an electronic transition of a chemical element. The energy values of the electronic transitions may be unique for the corresponding chemical element.

Further, the spectral lines of the X-ray spectrum may relate to at least one or a plurality of chemical elements (e.g. mineral elements).

Thus, optionally advantageously, the X-ray spectrum may comprise information about the chemical composition (e.g. mineral composition) of the corresponding second scan locations(s) relating to the mineral grains(s).

The method according to any of the preceding embodiments, wherein the post-processing step further comprises performing a spectral analysis step.

The spectral analysis step may comprise analyzing the at least one spectrum.

Analyzing the at least one spectrum may comprise comparing the at least one spectrum with at least one or a plurality of reference spectra.

Each reference spectrum may comprise a plurality of pre-defined spectral lines relating to one of the chemical elements.

The post-processing step may comprise assigning the spectral line(s) of the at least one spectrum to the chemical element(s) based on a result of the spectral analysis step.

The segmentation step, the dwell period adjustment step, the pre-processing step and the post-processing step may be computer implemented.

The spectral analysis step may be computer implemented.

The method may be a method for material analysis and mineralogy.

The sample may comprise a plurality of particles embedded in an epoxy matrix.

The size of each mineral grain may comprise dimensions ranging from at least 1 µm to at most 500 µm.

The scan point may comprise dimensions of at most a micron, preferably at most 100 nm.

A portion (such as a pixel) of the at least one image may comprise dimensions ranging from at least 10 nm to at most 1000 nm.

The method may comprise using the system according to any of the system embodiments.

The system may be configured for performing the method according to any of the preceding method embodiments.

In a third embodiment, a computer program product is disclosed.

A computer program product may comprise instructions which, when the program is executed by a computer, cause the computer to carry out the steps of the above-disclosed method.

Another computer program product may comprise instructions which, when the program is executed by the data-processing system (800), cause the data-processing system (800) to perform the steps for which the data-processing system is configured.

The following embodiments also form part of the invention.

SYSTEM EMBODIMENTS

Below, embodiments of a system will be discussed. The system embodiments are abbreviated by the letter "S" followed by a number. Whenever reference is herein made to the "system embodiments", these embodiments are meant.

S1. A system comprising a scanning microscope system (100) and a data-processing system (800), wherein the system is configured for
- providing at least one image of a sample based on first emissions from a plurality of first scan locations;
- determining at least one or a plurality of second scan location(s) for at least one or a plurality of region(s) of the at least one image;
- detecting second emissions from at least one of the second scan locations of at least one of the regions;
- adjusting a second dwell period with respect to an average segmentation dwell period.

S2. The system according to the preceding embodiment, wherein the scanning microscope system (100) comprises a first detector (111), wherein the first detector is configured for detecting the first emissions from the first scan locations.

S3. The system according to the preceding embodiment, wherein the first detector comprises a backscattered electron detector.

S4. The system according to any of the preceding embodiments, wherein the scanning microscope system (100) comprises a second detector (112), wherein the second detector is configured for detecting the second emissions from the second scan location(s).

S5. The system according to the preceding embodiment, wherein the second detector comprises an X-ray detector.

S6. The system according to any of the preceding embodiments, wherein the scanning microscope system (100) is configured for focusing a beam of charged particles (such as electrons) to a scan point on the sample.

S7. The system according to any of the preceding embodiments, wherein the scanning microscope system (100) is further configured for scanning the beam of charged particles over a plurality of scan locations in one or two dimensions.

S8. The system according to any of the preceding embodiments, wherein the scan locations correspond to the first scan locations.

S9. The system according to any of the preceding embodiments, wherein the scan locations correspond to the second scan locations.

S10. The system according to any of the preceding embodiments, wherein the system, in particular the data-processing system (800), is further configured for assigning a two-dimensional coordinate system to the sample.

S11. The system according to any of the preceding embodiments and with the features of S10, wherein the system, particularly the data-processing system (800), is configured for assigning the two-dimensional coordinate system of the sample to the at least one image.

S12. The system according to any of the preceding embodiments and with the features of S7, wherein a result of scanning the beam of charged particles over the scan locations of the sample comprises an interaction of the beam with the sample.

S13. The system according to the preceding embodiment and with the features of S1, wherein a result of the interaction comprises the first and/or the second emissions.

S14. The system according to the preceding embodiment and with the features of S1 and S13, wherein the first emissions comprise emissions of particles (such as backscattered electrons).

S15. The system according to the preceding embodiment and with the features of S1 and S13, wherein the second emissions comprise emissions of photons (such as X-rays).

S16. The system according to any of the preceding embodiments, wherein the system, particularly the data-processing system (800), is configured for generating the at least one image based on the first emissions detected at each first scan location.

S17. The system according to any of the preceding embodiments, wherein the at least one image corresponds to a backscattered electron image.

S18. The system according to any of the preceding embodiments, wherein the at least one image shows contrast between the regions (and/or parts thereof) with different properties (such as chemical compositions).

S19. The system according to the preceding embodiment, wherein the contrast comprises gray level variations and/or a black and white contrast.

S20. The system according to any of the preceding embodiments, wherein each region of the at least one image corresponds to a particle in the sample.

S21. The system according to the preceding embodiment, wherein each particle in the sample comprises at least one or a plurality of mineral grain(s).

S22. The system according to any of the preceding embodiments, wherein the scanning microscope system (100), particularly the first detector (111), is configured for detecting the first emissions for the duration time of a first dwell period at each first scan location.

S23. The system according to any of the preceding embodiments, wherein the scanning microscope system (100), particularly the second detector (112), is configured for detecting the second emissions for the duration time of the second dwell period at each second scan location.

S24. The system according to any of the two preceding embodiments, wherein the second dwell period is longer than the first dwell period.

S25. The system according to any of the preceding embodiments, wherein the system is configured for detecting the first emissions from the first scan locations and detecting the second emissions from the second scan location(s) at different time intervals, wherein the different time intervals correspond to non-overlapping time intervals.

S26. The system according to the preceding embodiment, wherein the data-processing system (800) comprises a data-storage component (810).

S27. The system according to the preceding embodiment, wherein the data-storage component (810) is configured for providing the at least one image of the sample.

S28. The system according to any of the preceding embodiments, wherein the data-processing system comprises a segmentation component (820), wherein the segmentation component (820) is configured for determining the second scan location(s) for the region(s) of the at least one image.

S29. The system according to any of the preceding embodiments, wherein the data-processing system, particularly the segmentation component (820) is configured for determining each second scan location for the duration time of a segmentation dwell period.

S30. The system according to the preceding embodiment, wherein the segmentation dwell period depends on image properties, such as the resolution and the magnification of the at least one image (and/or sections thereof).

S31. The system according to any of the preceding embodiments and with the features of S29, wherein the segmentation dwell period depends on the size of the mineral grain(s) and/or particle(s).

S32. The system according to any of the preceding embodiments, wherein the segmentation dwell period is longer than the second dwell period.

S33. The system according to any of the preceding embodiments and with the features of S32, wherein the data-processing system (800) further comprises a dwell period adjustment component (830), wherein the dwell period adjustment component is configured for adjusting the second dwell period with respect to the average segmentation dwell period.

S34. The system according to any of the preceding embodiments, wherein the data-processing system (800), particularly the dwell period adjustment component (830), is configured for determining the average segmentation dwell period based on sample statistics.

S35. The system according to the preceding embodiment, wherein determining the average segmentation dwell period comprises estimating an average time for determining each of the second scan locations of at least some preceding mineral grains and/or particles.

S36. The system according to any of the preceding embodiments and with the features of S34, wherein the sample statistics comprise statistical information of the sample properties, such as the particle size and/or the grain number per particle and/or the size distribution of the at least some preceding mineral grains and/or particles over the sample.

S37. The system according to any of the preceding embodiments and with the features of S1, wherein the data-processing system (800), particularly the dwell period adjustment component (830), is configured for generating an adjusted second dwell period.

S38. The system according to the preceding embodiment, wherein the adjusted second dwell period is equal to the average segmentation dwell period.

S39. The system according to any of the preceding method embodiments, wherein the data-processing system comprises a pre-processing component (840).

S40. The system according to the preceding embodiment, wherein the data-processing system (800), particularly the pre-processing component (840), is configured for applying a thresholding algorithm.

S41. The system according to the preceding embodiment, wherein the pre-processing component (840), particularly the thresholding algorithm, is configured for separating the at least one image into a background part and a foreground part based on a threshold intensity.

S42. The system according to any of the preceding embodiments, wherein the background part comprises background portions, wherein the background portions (e.g. pixels) comprise intensities lower than the threshold intensity (e.g. dark gray and/or black portions).

S43. The system according to any of the preceding embodiments, wherein the foreground part comprises foreground portions, wherein the foreground portions (e.g. pixels) comprise intensities higher than or equal to the threshold intensity (e.g. bright gray and/or white portions).

S44. The system according to the preceding embodiment, wherein delimiting/removing the background part comprises assigning to the background portions the same color value and/or intensity value (e.g. black portions).

S45. The system according to any of the preceding embodiments, wherein the foreground part comprises at least some of the regions of the image.

S46. The system according to any of the preceding embodiments, wherein the data-processing system (800), particularly the pre-processing component (840), is configured for determining the boundaries of the corresponding regions of the at least one image by means of a contouring algorithm.

S47. The system according to any of the preceding embodiments, wherein the pre-processing component (840), particularly the contouring algorithm, is configured for joining adjacent portions along the boundaries of the corresponding regions to curves.

S48. The system according to the preceding embodiment, wherein the adjacent portions along the boundaries of the corresponding regions are surrounded by the background portions (e.g. black portions).

S49. The system according to any of the preceding embodiments, wherein the data-processing system (800), particularly the pre-processing component (840), is further configured for applying a bounding box algorithm.

S50. The system according to the preceding embodiment, wherein the pre-processing component (840), particularly the bounding box algorithm, is configured for dividing the at least one image into at least two or a plurality of sub-images based on a result of the contouring algorithm.

S51. The system according to any of the preceding embodiments, wherein a sub-image of the at least one image is delimiting one region.

S52. The system according to any of the preceding embodiments, wherein the data-processing system (800), particularly the segmentation component (820), is configured for correcting a sub-image generation error.

S53. The system according to the preceding embodiment, wherein the sub-image generation error comprises generating at least one sub-image containing at least two neighboring regions.

S54. The system according to the preceding embodiment, wherein the at least two neighboring regions located within the one sub-image correspond to touching particles in the sample.

S55. The system according to any of the preceding embodiments, wherein at least one or more portions along the boundary of one of the neighboring regions are contiguous with at least one or more portions along the boundary of another of the neighboring regions.

S56. The system according to any of the preceding embodiments and with the features of S52, wherein correcting the sub-image generation error comprises processing each of the neighboring regions within the one sub-image individually.

S57. The system according to any of the preceding embodiments, wherein the data-processing system (800), particularly the segmentation component (820), is configured for processing the at least two sub-images individually.

S58. The system according to any of the preceding embodiments, wherein the data-processing system (800), particularly the segmentation component (820), is configured for determining the second scan locations for the at least two sub-images.

S59. The system according to any of the preceding embodiments, wherein the data-processing system (800), particularly the segmentation component (820), is configured for assigning contiguous portions of parts of the corresponding regions within the respective sub-images to clusters by means of a k-means clustering algorithm.

S60. The system according to any of the two preceding embodiments, wherein each region of the respective sub-image comprises at least one or a plurality of clusters.

S61. The system according to any of the preceding embodiments, wherein the data-processing system (800), particularly the segmentation component (820), is further configured for applying a flood fill algorithm, wherein the flood fill algorithm is configured for generating a mask for at least one of the clusters.

S62. The system according to the preceding embodiment, wherein generating the mask for the at least one of the clusters comprises assigning to contiguous portions within the corresponding cluster the same value of color and/or intensity.

S63. The system according to any of the preceding embodiments, wherein each mask is delimiting a part of the corresponding region.

S64. The system according to the preceding embodiment, wherein a part within each region of the at least one image corresponds to a mineral grain within the corresponding particle in the sample.

S65. The system according to any of the preceding embodiments, wherein the data-processing system (800), particularly the segmentation component (820), is configured for determining one second scan location for each mask.

S66. The system according to the preceding embodiment, wherein each second scan location corresponds to a centroid of the respective mask.

S67. The system according to any of the preceding embodiments, wherein the system, particularly the data-processing system (800), is configured for generating data sets for the corresponding regions within the respective sub-images.

S68. The system according to the preceding embodiment, wherein a data set comprises a list of the coordinates of the second scan location(s) relating to one of the regions.

S69. The system according to any of the preceding embodiments, wherein the data-processing system (800), particularly the data-storage component (810), is configured for providing at least one of the data sets.

S70. The system according to the preceding embodiment, wherein the system, particularly the scanning microscope system (100), is configured for focusing the beam on at least one of the second scan locations of the at least one of the data sets.

S71. The system according to the preceding embodiment, wherein the scanning microscope system (100), particularly the second detector (112), is configured for detecting the second emissions from the corresponding second scan location(s) upon irradiation of the sample with the beam.

S72. The system according to any of the preceding embodiments, wherein the system is further configured for determining the second scan location(s) for the regions (relating to the corresponding sub-images) and detecting the second emissions from the corresponding second scan location(s) of the region(s) in parallel.

S73. The system according to any of the preceding embodiments, wherein the data-processing system (800), particularly the segmentation component (820), is configured for processing the at least two sub-images for the duration of a first time interval.

S74. The system according to any of the preceding embodiments, wherein the scanning microscope system (100) is configured for focusing the beam on the second scan location(s) of the corresponding data set(s) and detecting the corresponding second emissions for the duration of a second time interval.

S75. The system according to any of the preceding embodiments, wherein the first time interval and the second time interval overlap.

S76. The system according to any of the preceding system embodiments, wherein the data-processing system (800) further comprises a post-processing component (850).

S77. The system according to any of the preceding embodiments and with the features of S76, wherein the data-processing system (800), particularly the post-processing component (850), is configured for correcting a segmentation error.

S78. The system according to the preceding embodiment, wherein the segmentation error comprises determining more than one second scan location for at least one of the masks.

S79. The system according to any of the two preceding embodiments, wherein the data-processing system (800), particularly the post-processing component (850), is configured for merging the second scan locations for the at least one of the masks into one second scan location by means of a merging operator.

S80. The system according to any of the preceding embodiments, wherein the data-processing system (800), particularly the post-processing component (850), is configured for generating at least one spectrum based on the second emissions from at least one of the second scan locations of the at least one of the regions.

S81. The system according to any of the preceding embodiments, wherein the data-processing system (800), particularly the data-storage component (810), is configured for providing the at least one spectrum.

S82. The system according to the preceding embodiment, wherein the at least one spectrum corresponds to an X-ray spectrum.

S83. The system according to the preceding embodiment, wherein the X-ray spectrum comprises the number of detected X-ray photons (i.e. intensity) at the respective energies.

S84. The system according to any of the preceding embodiments, wherein the X-ray spectrum comprises at least one or a plurality of spectral line(s).

S85. The system according to the preceding embodiment, wherein each spectral line corresponds to an electronic transition of a chemical element.

S86. The system according to any of the three preceding embodiments, wherein the spectral line(s) of the X-ray spectrum relate to at least one or a plurality of chemical elements.

S87. The system according to any of the preceding embodiments, wherein the X-ray spectrum comprises information about the chemical composition (e.g. mineral composition) of the corresponding second scan location relating to the respective mineral grain.

S88. The system according to any of the preceding embodiments, wherein the data-processing system (800), particularly the post-processing component (850), is further configured for performing a spectral analysis step.

S89. The system according to the preceding embodiment and with the features of S81, wherein the spectral analysis step comprises analyzing the at least one spectrum.

S90. The system according to the preceding embodiment, wherein analyzing the at least one spectrum comprises comparing the spectrum with at least one or a plurality of reference spectra.

S91. The system according to the preceding embodiment, wherein each reference spectrum comprises a plurality of pre-defined spectral lines relating to one of the chemical elements (e.g. mineral elements).

S92. The system according to any of the two preceding embodiments, wherein the data-processing system (800), particularly the post-processing component (850), is configured for assigning the spectral line(s) of the at least one spectrum to the chemical element(s) based on a result of the spectral analysis step.

S93. The system according to any of the preceding embodiments, wherein the system is a system configured for material analysis and mineralogy.

S94. The system according to any of the preceding embodiments, wherein the sample comprises a plurality of particles embedded in an epoxy matrix.

S95. The system according to the preceding embodiment, wherein the size of each mineral grain comprises dimensions ranging from at least 1 μm to at most 500 μm.

S96. The system according to any of the preceding embodiments, wherein the scan point comprises dimensions of at most a micron.

S97. The system according to the preceding embodiment, wherein a portion (such as a pixel) of the at least one image comprises dimensions ranging from at least 10 nm to at most 1000 nm.

S98. The system according to any of the preceding embodiments, wherein the system further comprises a control unit (700a), wherein the control unit (700a) is configured for controlling the power supply and the operation of some of the components of the scanning microscope system (100), such as a condensing lens (104), an objective lens (106), a scanning coil (105) and a movable stage (113).

S99. The system according to any of the preceding embodiments, wherein the system further comprises a vacuum system, wherein the vacuum system comprises a vacuum controller (700b), a mechanical pumping system (710), an ultra-high vacuum pump (720) and a vacuum chamber (730).

S100. The system according to the preceding embodiment, wherein the mechanical pumping system (710) and the ultra-high vacuum pump (720) are configured for providing an ultra-high vacuum within the vacuum chamber (730).

S101. The system according to the preceding embodiment, wherein the vacuum chamber is configured for containing a sample (108), the movable stage (113), the first detector (111), the second detector (112) or parts thereof, and a scanning electron microscope (101) or parts thereof.

METHOD EMBODIMENTS

Below, embodiments of a method will be discussed. The method embodiments are abbreviated by the letter "M" followed by a number. Whenever reference is herein made to the "method embodiments", these embodiments are meant.

M1. A method for determining properties of a sample, comprising:
 performing an image providing step, comprising providing at least one image of the sample based on first emissions from a plurality of first scan locations;
 performing a segmentation step, comprising determining at least one or a plurality of second scan location(s) for at least one or a plurality of region(s) of the at least one image;
 performing a detection step, comprising detecting second emissions from at least one of the second scan locations of at least one of the regions.
 performing a dwell period adjustment step, comprising adjusting a second dwell period with respect to an average segmentation dwell period.

M2. The method according to any of the preceding embodiments further comprising the step of focusing a beam of charged particles (such as electrons) to a scan point on the sample.

M3. The method according to any the preceding embodiments, wherein the method further comprises scanning the beam of charged particles over a plurality of scan locations in one or two dimensions.

M4. The method according to any of the preceding embodiments, wherein the scan locations correspond to the first scan locations.

M5. The method according to any of the preceding embodiments, wherein the scan locations correspond to the second scan locations.

M6. The method according to any of the preceding embodiments, wherein the method further comprises assigning a two-dimensional coordinate system to the sample.

M7. The method according to any of the preceding embodiments and with the features of M6, wherein the method further comprises assigning the two-dimensional coordinate system of the sample to the at least one image.

M8. The method according to any of the preceding embodiments and with the features of M3, wherein a result of scanning the beam of charged particles over the scan locations of the sample comprises an interaction of the beam with the sample.

M9. The method according to the preceding embodiment and with the features of M1, wherein a result of the interaction comprises the first and/or the second emissions.

M10. The method according to the preceding embodiment and with the features of M1 and M9, wherein the first emissions comprise emissions of particles (such as backscattered electrons).

M11. The method according to any of the preceding embodiments and with the features of M1 and M9, wherein the second emissions comprise emissions of photons (such as X-rays).

M12. The method according to any of the preceding embodiments, wherein the method further comprises detecting the first emissions from each first scan location.

M13. The method according to the preceding embodiment, wherein the method further comprises generating the at least one image based on the first emissions detected at each first scan location.

M14. The method according to any of the preceding embodiments, wherein the at least one image corresponds to a backscattered electron image.

M15. The method according to any of the preceding embodiments, wherein the at least one image shows contrast between the regions (and/or parts thereof) with different properties (such as chemical compositions).

M16. The method according to the preceding embodiment, wherein the contrast comprises gray level variations and/or a black and white contrast.

M17. The method according to any of the preceding embodiments, wherein each region of the at least one image corresponds to a particle in the sample.

M18. The method according to the preceding embodiment, wherein each particle in the sample comprises at least one or a plurality of mineral grains.

M19. The method according to any of the preceding embodiments, wherein the method further comprises detecting the first emissions for the duration time of a first dwell period at each first scan location.

M20. The method according to any of the preceding embodiments, wherein the detection step further comprises detecting the second emissions for the duration time of the second dwell period at each second scan location.

M21. The method according to any of the two preceding embodiments, wherein the second dwell period is longer than the first dwell period.

M22. The method according to any of the preceding embodiments, wherein the method further comprises detecting the first emissions and detecting the second emissions at two different time intervals, wherein the two different time intervals correspond to non-overlapping time intervals.

M23. The method according to the preceding embodiment, wherein the segmentation step comprises determining each second scan location for the duration time of a segmentation dwell period.

M24. The method according to the preceding embodiment, wherein the segmentation dwell period depends on image properties, such as the resolution and the magnification of the at least one image (and/or sections thereof).

M25. The method according to any of the preceding embodiments and with the features of M23, wherein the segmentation dwell period depends on the size of the mineral grain(s) and/or particle(s).

M26. The method according to any of the preceding embodiments, wherein the segmentation dwell period is longer than the second dwell period.

M27. The method according to any of the preceding embodiments, wherein the dwell period adjustment step further comprises determining the average segmentation dwell period based on sample statistics.

M28. The method according to the preceding embodiment, wherein determining the average segmentation dwell period comprises estimating an average time for determining each of the second scan locations of at least some preceding mineral grains and/or particles.

M29. The method according to any of the preceding embodiments, wherein the dwell period adjustment step comprises determining/obtaining the sample statistics based on measurements on at least some preceding mineral grains and/or particles of the sample.

M30. The method according to the preceding embodiment, wherein the sample statistics comprise statistical information of the sample properties, such as the particle size and/or the grain number per particle and/or the size distribution of the at least some preceding mineral grains and/or particles over the sample.

M31. The method according to any of the preceding embodiments and with the features of M1, wherein the dwell period adjustment step comprises generating an adjusted second dwell period.

M32. The method according to the preceding embodiment, wherein the adjusted second dwell period is equal to the average segmentation dwell period.

M33. The method according to any of the preceding method embodiments, wherein the method further comprises a pre-processing step.

M34. The method according to the preceding embodiment, wherein the pre-processing step comprises applying a thresholding algorithm.

M35. The method according to the preceding embodiment, wherein the thresholding algorithm comprises separating the at least one image into a background part and a foreground part based on a threshold intensity.

M36. The method according to any of the preceding embodiments, wherein the background part comprises background portions, wherein the background portions (e.g. pixels) comprise intensities lower than the threshold intensity (e.g. dark gray and/or black portions).

M37. The method according to any of the preceding embodiments, wherein the foreground part comprises foreground portions, wherein the foreground portions (e.g. pixels) comprise intensities higher than or equal to the threshold intensity (e.g. bright gray and/or white portions).

M38. The method according to any of the preceding embodiments, wherein the thresholding algorithm comprises delimiting/removing the background part.

M39. The method according to the preceding embodiment, wherein delimiting/removing the background part comprises assigning to the background portions the same color value and/or intensity value (e.g. black portions).

M40. The method according to any of the preceding embodiments, wherein the foreground part comprises at least some of the regions of the image.

M41. The method according to the preceding embodiment, wherein the pre-processing step comprises determining the boundaries of the corresponding regions of the at least one image by means of a contouring algorithm.

M42. The method according to the preceding embodiment, wherein the contouring algorithm comprises joining adjacent portions along the boundaries of the corresponding regions to curves.

M43. The method according to the preceding embodiment, wherein the adjacent portions along the boundaries of the corresponding regions are surrounded by the background portions (e.g. black portions).

M44. The method according to any of the preceding embodiments, wherein the pre-processing step further comprises applying a bounding box algorithm, wherein the bounding box algorithm comprises dividing the at least one image into at least two or a plurality of sub-images based on a result of the contouring algorithm.

M45. The method according to any of the two preceding embodiments, wherein a sub-image of the at least one image is delimiting one region.

M46. The method according to any of the preceding embodiments, wherein the segmentation step comprises correcting a sub-image generation error.

M47. The method according to the preceding embodiment, wherein the sub-image generation error comprises generating at least one sub-image containing at least two neighboring regions.

M48. The method according to the preceding embodiment, wherein the at least two neighboring regions located within the one sub-image correspond to touching particles in the sample.

M49. The method according to any of the preceding embodiments, wherein at least one or more portions along the boundary of one of the neighboring regions are contiguous with at least one or more portions along the boundary of another of the neighboring regions.

M50. The method according to any of the preceding embodiments and with the features of M46, wherein correcting the sub-image generation error comprises processing each of the neighboring regions within the one sub-image individually.

M51. The method according to any of the preceding embodiments, wherein the method further comprises performing the segmentation step on the at least two sub-images individually.

M52. The method according to any of the preceding embodiments, wherein the segmentation step comprises assigning contiguous portions of parts of the corresponding regions within the respective sub-images to clusters by means of a k-means clustering algorithm.

M53. The method according to any of the two preceding embodiments, wherein each region of the respective sub-image comprises at least one or a plurality of clusters.

M54. The method according to any of the preceding embodiments and with the features of M52, wherein the segmentation step further comprises applying a flood fill algorithm, wherein the flood fill algorithm comprises generating a mask for at least one of the clusters.

M55. The method according to the preceding embodiment, wherein generating the mask for the at least one of the clusters comprises assigning to contiguous portions within the corresponding cluster the same value of color and/or intensity.

M56. The method according to any of the preceding embodiments, wherein each mask is delimiting a part of the corresponding region.

M57. The method according to the preceding embodiment, wherein a part within each region of the at least one image corresponds to a mineral grain within the corresponding particle in the sample.

M58. The method according to any of the preceding embodiments, wherein the segmentation step further comprises determining one second scan location for each mask.

M59. The method according to the preceding embodiment, wherein each second scan location corresponds to a centroid of the respective mask.

M60. The method according to any of the preceding embodiments, wherein the method further comprises generating data sets for the regions within the respective sub-images.

M61. The method according to the preceding embodiment, wherein a data set comprises a list of the coordinates of the second scan location(s) relating to one of the regions.

M62. The method according to any of the preceding embodiments, wherein the method further comprises providing at least one of the data sets.

M63. The method according to any of the preceding embodiments, wherein the detection step comprises focusing the beam on at least one of the second scan locations of the at least one of the data sets.

M64. The method according to the preceding embodiment, wherein the detection step further comprises detecting the second emissions from the corresponding second scan location(s) upon irradiation of the sample with the beam.

M65. The method according to any of the preceding embodiments, wherein the method further comprises performing the segmentation step and the detection step in parallel.

M66. The method according to any of the preceding embodiments, wherein the method comprises performing the segmentation step for the duration of a first time interval.

M67. The method according to any of the preceding embodiments, wherein the method further comprises performing the detection step for the duration of a second time interval.

M68. The method according to any of the preceding embodiments, wherein the first time interval and the second time interval overlap.

M69. The method according to any of the preceding method embodiments, wherein the method further comprises a post-processing step.

M70. The method according to any of the preceding embodiments and with the features of M69, wherein the post-processing step comprises correcting a segmentation error.

M71. The method according to the preceding embodiment, wherein the segmentation error comprises determining more than one second scan location for at least one of the masks.

M72. The method according to any of the two preceding embodiments, wherein the post-processing step comprises merging the second scan locations for the at least one of the masks into one second scan location by means of a merging operator.

M73. The method according to any of the preceding embodiments, wherein the method further comprises generating and providing at least one spectrum based on the second emissions from the at least one of the second scan locations of the at least one of the regions.

M74. The method according to any of the preceding embodiments and with the features of M73, wherein the at least one spectrum corresponds to an X-ray spectrum.

M75. The method according to the preceding embodiment, wherein the X-ray spectrum comprises the number of detected X-ray photons at the respective energies.

M76. The method according to any of the two preceding embodiments, wherein the X-ray spectrum comprises at least one or a plurality of spectral lines.

M77. The method according to any of the three preceding embodiments, wherein each spectral line corresponds to an electronic transition of a chemical element.

M78. The method according to any of the four preceding embodiments, wherein the spectral lines of the X-ray spectrum relate to at least one or a plurality of chemical elements.

M79. The method according to any of the five preceding embodiments, wherein the X-ray spectrum comprises information about the chemical composition (e.g. mineral composition) of the corresponding second scan location(s) relating to the respective mineral grain(s).

M80. The method according to any of the preceding embodiments, wherein the post-processing step further comprises performing a spectral analysis step.

M81. The method according to the preceding embodiment and with the features of M73, wherein the spectral analysis step comprises analyzing the at least one spectrum.

M82. The method according to the preceding embodiment, wherein analyzing the at least one spectrum comprises comparing the at least one spectrum with at least one or a plurality of reference spectra.

M83. The method according to the preceding embodiment, wherein each reference spectrum comprises a plurality of pre-defined spectral lines relating to one of the chemical elements (e.g. mineral elements).

M84. The method according to any of the two preceding embodiments, wherein the post-processing step comprises assigning the spectral line(s) of the at least one spectrum to the chemical element(s) based on a result of the spectral analysis step.

M85. The method according to any of the preceding method embodiments, wherein the segmentations step, the dwell period adjustment step, the pre-processing step and the post-processing step are computer implemented.

M86. The method according to any of the preceding method embodiments with the features of M80, wherein the spectral analysis step is computer implemented.

M87. The method according to any of the preceding embodiments, wherein the method is a method for material analysis and mineralogy.

M88. The method according to any of the preceding embodiments, wherein the sample comprises a plurality of particles embedded in an epoxy matrix.

M89. The method according to the preceding embodiment, wherein the size of each mineral grain comprises dimensions ranging from at least 1 μm to at most 500 μm.

M90. The method according to any of the preceding embodiments, wherein the scan point comprises dimensions of at most a micron.

M91. The method according to the preceding embodiment, wherein a portion (such as a pixel) of the at least one image comprises dimensions ranging from at least 10 nm to at most 1000 nm.

M92. The method according to any of the preceding method embodiments, wherein the method comprises using the system according to any of the system embodiments.

S102. The system according to any of the preceding system embodiments, wherein the system is configured for performing the method according to any of the preceding method embodiments.

Below, embodiments of a computer program product will be discussed. These embodiments are abbreviated by the letter "C" followed by a number. Whenever reference is herein made to the "computer program product embodiments", these embodiments are meant.

C1. A computer program product comprising instructions which, when the program is executed by a computer, cause the computer to carry out the steps of the method according to any of the method embodiments.

C2. A computer program product comprising instructions which, when the program is executed by a data-processing system (800), cause the data-processing system (800) to perform the steps for which the data-processing system (800) of the system according to any of the system embodiments is configured.

Exemplary features of the invention are further detailed in the figures and the below description of the figures.

For the sake of clarity, some features may only be shown in some figures, and others may be omitted. However, also the omitted features may be present, and the depicted and discussed features do not need to be present in all embodiments.

FIG. 1 shows components of a scanning microscope system 100. The scanning microscope system 100 may be configured for generating a primary beam of charged particles (e.g. electrons or ions). The scanning microscope system may further comprise a scanning electron microscope 101. In this example, the primary beam comprises an electron beam 107. An electron source 102 may be configured for emitting the electron beam, wherein a voltage is applied between the electron source 102 and an anode 103. The applied voltage may preferably range from at least 2 kV to at most 30 kV. The scanning microscope system may also comprise electromagnetic lenses. The electromagnetic lenses may be configured for controlling the path of the electron beam. At least one condensing lens 104 may be comprised by the electromagnetic lenses. The condensing lens 104 may be configured for determining the size of the electron beam. Moreover, at least one objective lens 106 may be comprised by the electromagnetic lenses. The objective lens 106 may be configured for focusing the electron beam to a scan point on the sample. The scan point may correspond to an electron spot on a sample 108. Further, the dimensions and the shape of the scan point may depend on the focusing properties of the electromagnetic lenses (e.g. applied current) and the working distance between the scanning electron microscope 101 and the sample 108. A scanning coil 105 may be configured for deflecting the electron beam 107 over a plurality of scan locations in one or two dimensions. Thus, optionally advantageously, this may enable a two-dimensional scanning of the sample. The scan locations may correspond to first scan locations. The scan locations may also correspond to second scan locations. The scanning coil 105 may be magnetic or electrostatic.

The scanning microscope system can be configured for generating first and second emissions 109, 110. The electron beam 107 may interact with particles (such as atoms) of the sample 108. The interaction may result to the first and the second emissions 109, 110. The first emissions 109 may comprise emissions of charged particles, such as backscattered electrons. However, the first emissions may also comprise emissions of secondary, transmitted and/or Auger electrons. Further, the second emissions 110 may comprise emissions of photons, such as X-rays and/or light (e.g. visible light).

The scanning microscope system 100 may also comprise a first detector 111, wherein the first detector 111 may be configured for detecting the first emissions 109 from the first scan locations in a sequential manner. In particular, the first detector (111), may be configured for detecting the first emissions over a first dwell period at each first scan location.

The first detector 111 may comprise a backscattered electron detector, such as a segmented silicon drift detector. However, the backscattered electron detector may also correspond to other types of solid-state detectors. Moreover, the first detector 111 may also comprise a secondary electron detector, such as an Everhart-Thornley detector, or a transmitted electron detector (e.g. CMOS detector). The transmitted electron detector may be placed below the sample 108 in order to detect transmitted electrons.

Further, the electron microscope system may comprise a second detector 112, wherein the second detector 112 may be configured for detecting the second emissions 110 from the second scan locations in a sequential manner. In particular, the second detector (112), may be configured for detecting the second emissions over a second dwell period at each second scan location. The second detector 112 may comprise an X-ray detector, wherein the X-ray detector may comprise a silicon drift detector. However, the X-ray detector may also comprise other types of detectors (e.g. scintillation detectors). The second detector 112 may be tilted with respect to the surface of the sample 108. The angle between a center line 114 of the second detector and the sample surface may be adjustable and may range from 0° to at most 90°.

The X-ray detector may be comprised by an energy-dispersive spectrometer (EDS). The energy bandwidth of the EDS may range from 0 to at most 17 keV. In another modality the X-ray detector may be comprised by a wavelength-dispersive spectrometer (WDS). Further, the second detector 112 may also be comprised by an electron energy loss spectrometer or a cathodoluminescence spectrometer.

The sample 108 may be positioned on top of a movable stage 113. The movable stage 113 may be configured for performing two horizontal movements, a vertical movement, a tilting movement, and/or a rotational movement, with respect to the plane of the sample. The two horizontal movements may comprise selecting a field of view. The vertical movement may comprise changing the height of the sample and thus the depth of focus and/or the image resolution.

The scanning microscope system 100 may further comprise a control unit 700a. The control unit 700a may be configured for controlling the power supply and operation of the condensing lens 104, the objective lens 106, the scanning coil 105 and the movable sage 113. Further, the scanning microscope system may comprise a vacuum system. The vacuum system may comprise a vacuum controller 700b, a mechanical pumping system 710, an ultra-high vacuum pump 720 (such as an ion pump) and a vacuum chamber 730. The vacuum controller 700b may be configured for controlling the operation of the mechanical pumping system 710 and the ultra-high vacuum pump 720. The mechanical pumping system 710 and the ultra-high vacuum pump 720 may be configured for providing an ultra-high vacuum within the vacuum chamber 730. The vacuum chamber may be configured for containing the sample 108, the movable stage 113, the first detector 111, the second detector 112 or parts thereof, and the scanning electron microscope 101 or parts thereof.

Figure 2:
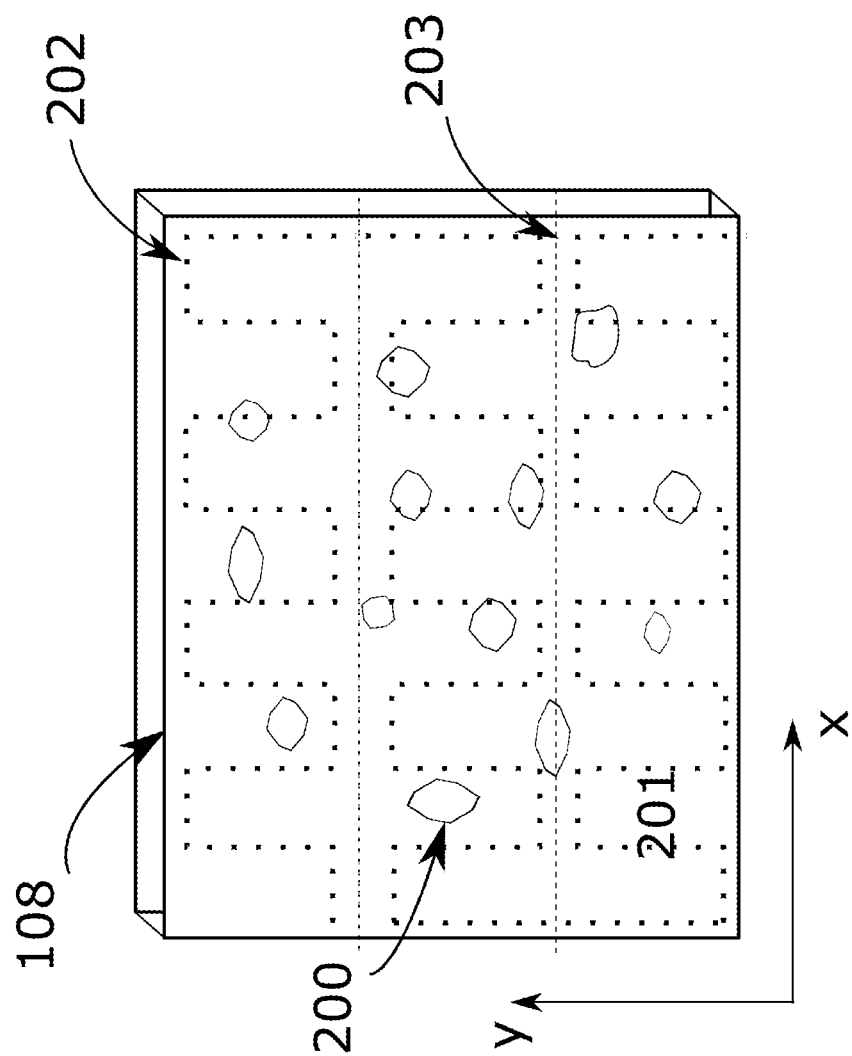
FIG. 2 shows a sample of particles.

FIG. 2 shows the sample 108 containing a plurality of particles 200, wherein each particle may comprise at least one or a plurality of mineral grains. The particles 200 may be embedded in an epoxy matrix 201. An internal two-dimensional coordinate system (x,y) may be assigned to the sample 108. In this example, the origin of the internal coordinate system may be assigned to the lower left corner of the sample. Further, FIG. 2 shows the first scan locations 202. The sequence of the first scan locations may correspond to a scanning pattern. As can be seen in FIG. 2, the scanning pattern may correspond to a second order serpentine pattern. The second order serpentine pattern may comprise a large serpentine pattern that moves back and forth along large rows (dashed lines 203) and a small serpentine pattern that moves up and down within every single row. However, the scanning pattern may also correspond to continuous fractal space- or plane-filling curves, such as Hilbert or Moore curves.

Figure 3:
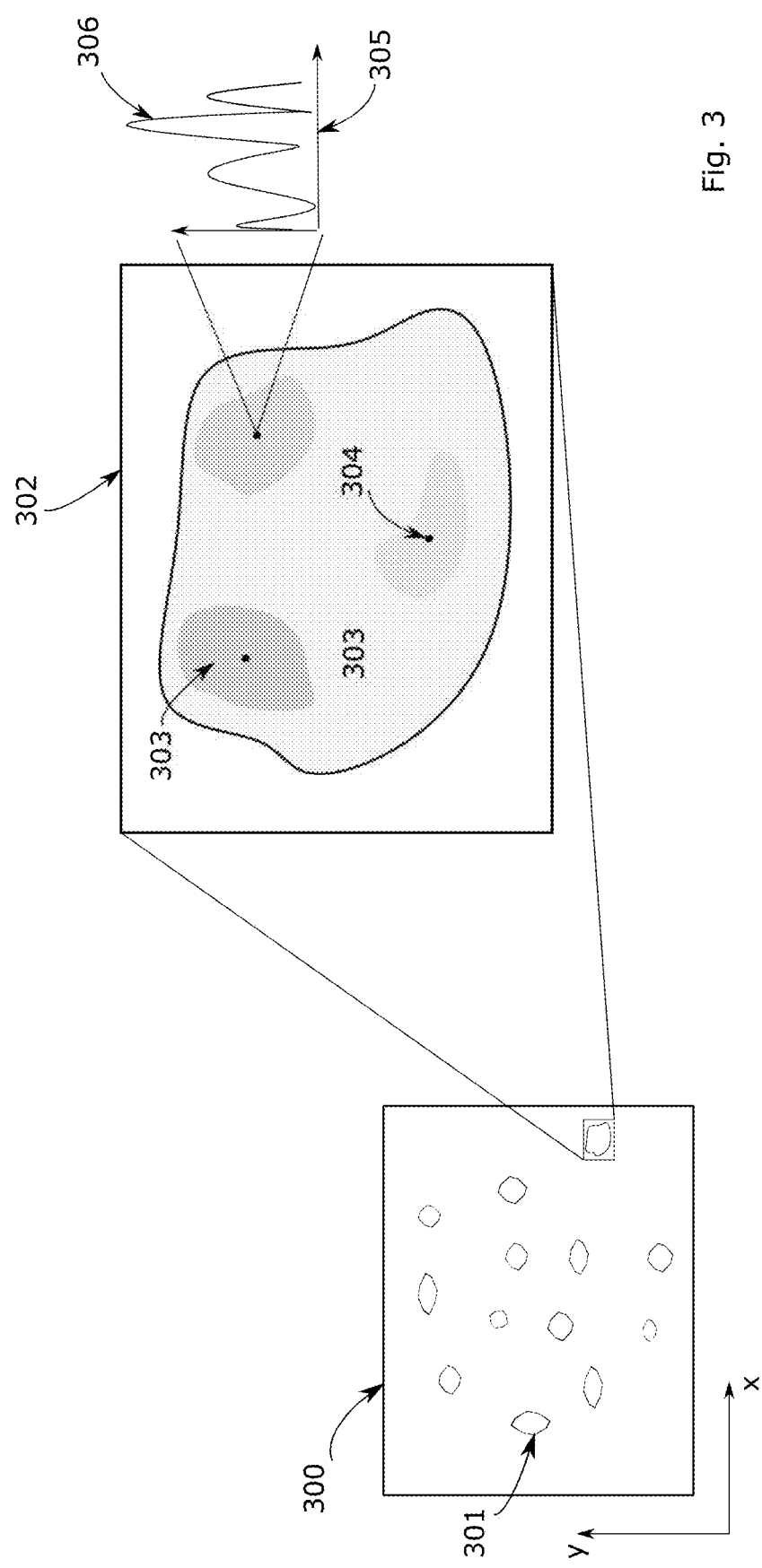
FIG. 3 shows an image of the sample and a sub-image of a poly-mineral particle.

FIG. 3 shows an image 300 of the sample 108. The image may comprise regions 301, wherein each region may correspond to a particle 200 of the sample. The image 300 may be generated based on the first emissions 109 detected at the corresponding first scan locations 202. In this example, the image may be generated based on emissions of backscattered electrons. The image may comprise a two-dimensional grid, wherein each square of the grid corresponds to a portion (such as a pixel). Each portion in the image may correspond to a scan point on the sample. The backscattered electron data may be stored point-by-point in the respective portion of the image. Thus, the intensity of each portion may depend on the number of backscattered electrons detected at the respective scan point. Further, the same internal two-dimensional coordinate system (x,y) of the sample 108, may also be assigned to the image 300. Thus, the location of each portion in the image may be tracked as the electron beam moves across the first scan locations of the sample. Assigning the same coordinate system of the sample to the image may be accomplished by means of reference points of known coordinates, wherein the reference points may be incorporated in the sample 108 or the movable stage 113.

Further, FIG. 3 shows a sub-image 302 comprising a region 301, wherein the sub-image 302 is a section of the image 300. The region 301 of the sub-image 302 may comprise masks 303, wherein each mask may approximate or delimit a part within the region. Moreover, each mask may comprise portions of the same color (and/or intensity). In other words, each part is masked/filled with a different color information (and/or intensity). Each part of the region may correspond to a mineral grain within the corresponding particle 200.

In the example of FIG. 3, each mask comprises a second scan location 304, wherein the second scan location may correspond to a centroid or another estimation of the corresponding mask. The first and the second scan locations may be specified with respect to the same two-dimensional coordinate system (x,y).

FIG. 3 further depicts a spectrum 305, wherein the spectrum may be generated based on the second emissions 110 detected at the corresponding second scan location 304. In this example, the spectrum may comprise a graph, wherein the graph depicts the number of detected X-ray photons (i.e. intensity) at the respective energies. As can be seen in FIG. 3, the X-ray spectrum may comprise spectral lines 306 at different energy values. Moreover, the spectral lines 306 may comprise a line width, thus being distributed over a range of energy values rather than being located at a single energy value. Thus, different spectral lines relating to the same and/or different elements may overlap. The peak of each spectral line 306 at the corresponding line center may correspond to the maximum number of detected X-ray photons (i.e. peak intensity) within the respective line width. Each spectral line may correspond to an electronic transition of a chemical element (such as silicon, iron, etc.). Further, the X-ray spectrum may comprise spectral lines relating to at least one or a plurality of chemical elements. Thus, optionally advantageously, the spectrum may comprise information about the chemical composition (e.g. mineral composition) of the corresponding second scan locations relating to the mineral grains.

Figure 4:
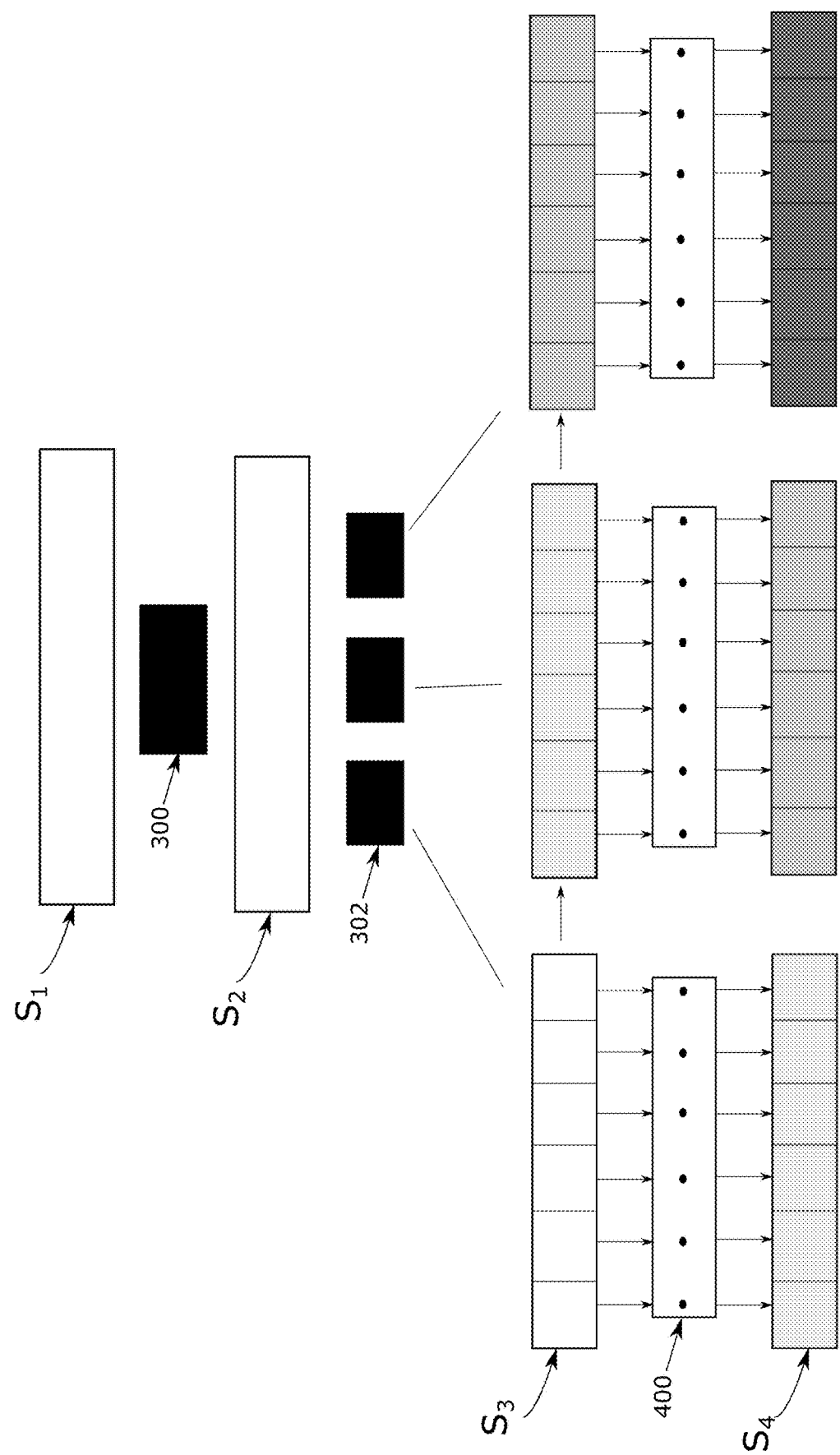
FIG. 4 shows an embodiment of a method.

FIG. 4 shows a method. A system can be configured for performing the method.

The method in FIG. 4 comprises an image providing step S1, a sub-image generation step S2, a segmentation step S3 and a detection step S4.

The image providing step may comprise providing at least one image 300 of the sample 108. The image may correspond to a backscattered electron image.

The sub-image generation step may comprise identifying at least some of the regions 301 in the at least one image 300. In particular, the sub-image generation step may comprise applying a thresholding algorithm, wherein the thresholding algorithm may comprise separating the at least one image into a background part and a foreground part based on a threshold intensity.

In particular, the background part may comprise background portions, wherein the background portions (e.g. pixels) may comprise intensities lower than the threshold intensity (e.g. dark gray and/or black portions).

Further, the foreground part may comprise foreground portions, wherein the foreground portions (e.g. pixels) may comprise intensities higher than or equal to the threshold intensity (e.g. bright gray and/or white portions).

In fact, the foreground part may comprise the at least some of the regions 301 of the image 300.

The sub-image generation step may comprise removing/delimiting the background part. Moreover, removing/delimiting the background part may comprise assigning to the background portions the same color value and/or intensity value (e.g. black portions).

Further, the sub-image generation step may comprise applying a contouring algorithm, wherein the contouring algorithm may comprise detecting the boundaries of the at least some regions 301 of the image. Further, the contouring algorithm may comprise joining adjacent portions (e.g. pixels) along the boundary of each region to a curve. The adjacent portions along the boundary of each region may be surrounded by the background portions. The sub-image generation step may further comprise applying a bounding box algorithm, wherein the bounding box algorithm comprises dividing the image 300 into a plurality of sub-images 302 based on a result of the contouring algorithm. Thus, each identified region 301 is located within one corresponding sub-image 302. In the example of FIG. 4 the sub-image generation step comprises identifying three regions and generating the corresponding three sub-images.

The segmentation step may comprise applying a k-means clustering algorithm on the sub-images 302 individually, wherein the k-means algorithm may comprise assigning contiguous portions of the parts within each region to clusters.

Moreover, the segmentation may also comprise applying a flood fill algorithm on the sub-images 302 individually, wherein the flood fill algorithm may comprise generating a mask for each cluster of the region of the corresponding sub-image. As mentioned above, each mask may comprise portions of the same color. Each individual mask is delimiting a part of the region, wherein each part may correspond to a mineral grain within the corresponding particle 200.

The segmentation step may also comprise determining the second scan location 304 for each mask. This may be done, for example, by means of a watershed algorithm. Each second scan location may be generated during a segmentation dwell period. In one example, the segmentation dwell period is a time period for generating the mask in the sub-image. In another example, the segmentation dwell period is a time period for delimiting a part in the sub-image corresponding to a mineral grain. In yet another example, the segmentation dwell period is a time period for determining a second scan location. Generally, the segmentation dwell period may depend on the resolution and/or the magnification of the image 300 and/or the sub-image 302. The segmentation dwell period may further depend on the size of the individual mineral grain and/or particles. However, sample statistics, such as particle size, grain number per particle and size distribution over the sample, have low statistical spread throughout the same sample and/or a replicant sample. Thus, this may lead to low variations of the segmentation dwell period from one second scan location to another.

The detection step may comprise scanning the electron beam over the second scan locations and detecting the corresponding second emissions sequentially. In this example, the second emissions comprise emissions of X-ray photons. The integration time at every second scan location may correspond to a second dwell period. Further, the method may further comprise storing the detected X-ray photons sequentially for every second scan location. The second dwell period may be four orders of magnitude higher than the first dwell period. For example, the second dwell period may correspond to 10 ms and the first dwell period may correspond to 1 µs. Thus, the first and the second emissions may be integrated over different dwell periods and detected over different scan locations. Moreover, the first and the seconds emissions may be detected at different times. Thus, the image providing step and the detection step may take place at different times as well.

The segmentation step and the detection step may take place in parallel. In this example, the method may comprise selecting the sub-images 302 sequentially. The segmentation step may comprise determining the second locations for the corresponding region of one of the sub-images. The method further comprises storing the coordinates of the second scan locations of the one sub-image in a data set 400. The method also comprises providing the data set 400 as an input for the detection step. In the example of FIG. 4 the individual dots in each data set represent the determined second scan locations in the corresponding sub-image. The number of the second scan locations in every sub-image is the same, as indicated in FIG. 4. However, the number of second scan locations may depend on the number of mineral grains within the respective particle relating to a sub-image. Thus, the number of the second scan locations may vary from one sub-image to another. The method also comprises detecting the X-ray photons from every second scan location of the data set relating to the one sub-image sequentially, while at the same time selecting another sub-image and determining another set of second scan locations. In this example, the pairs of blocks (S3 and S4) with the same shade of gray comprise the individual steps that take place in parallel. The method may comprise repeating the process until all of the sub-images have been selected and processed.

The parallel segmentation and X-ray acquisition allows to reduce the overall acquisition time by several factors and by a factor of at least 1.2, preferably by a factor of at least 1.4 and even more preferably by a factor of at least 2. This approach has an advantage over previous and slower methods that involved performing the segmentation and X-ray acquisition at different times. In particular, these methods involved segmenting the entire backscattered electron image for tens of seconds and processing every region within the image, while keeping the X-ray detection blocked. The second scan locations were provided for the X-ray acquisition after the segmentation of the entire image had finished.

Moreover, the segmentation dwell period may be shorter than the second dwell period. For example, the segmentation dwell period may correspond on average to 3 ms and the second dwell period may correspond to 10 ms. Thus, the method may comprise allocating more time for the segmentation step and setting the segmentation dwell period to be on average equal to the second dwell period of the X-ray detection. In fact, in the example of FIG. 4, the segmentation dwell period and the second dwell period are equal at each second scan location. This is illustrated by the matching length of the corresponding individual boxes for S3 and S4. This may allow for a high time overlap between the segmentation step and the detection step, i.e. the segmentation step and the detection step happen in parallel for more than 99% of the overall acquisition time. Allocating more time for the segmentation step may allow for the method to provide more accurate (i.e. less over-segmented) results. Thus, optionally advantageously, the segmentation step may take the same time as the detection step with no negative impact on overall acquisition speed and/or accuracy.

However, the segmentation dwell period may also be longer than the second dwell period. This may be the case when the image is highly resolved and/or magnified and/or the size of the grains is considerable.

Thus, the method may further comprise a dwell period adjustment step, wherein the dwell period adjustment step comprises adjusting/increasing the second dwell period of the detection step with respect to an average segmentation dwell period. Moreover, the dwell period adjustment step may comprise determining the average segmentation dwell period based on sample statistics, wherein the sample statistics are determined based on measurements on at least some preceding mineral grains and/or particles of the sample. The sample statistics may comprise statistical information of the sample properties, such as the particle size and/or grain number per particle and/or the size distribution of the at least some preceding mineral grains and/or particles over the sample.

Figure 5:
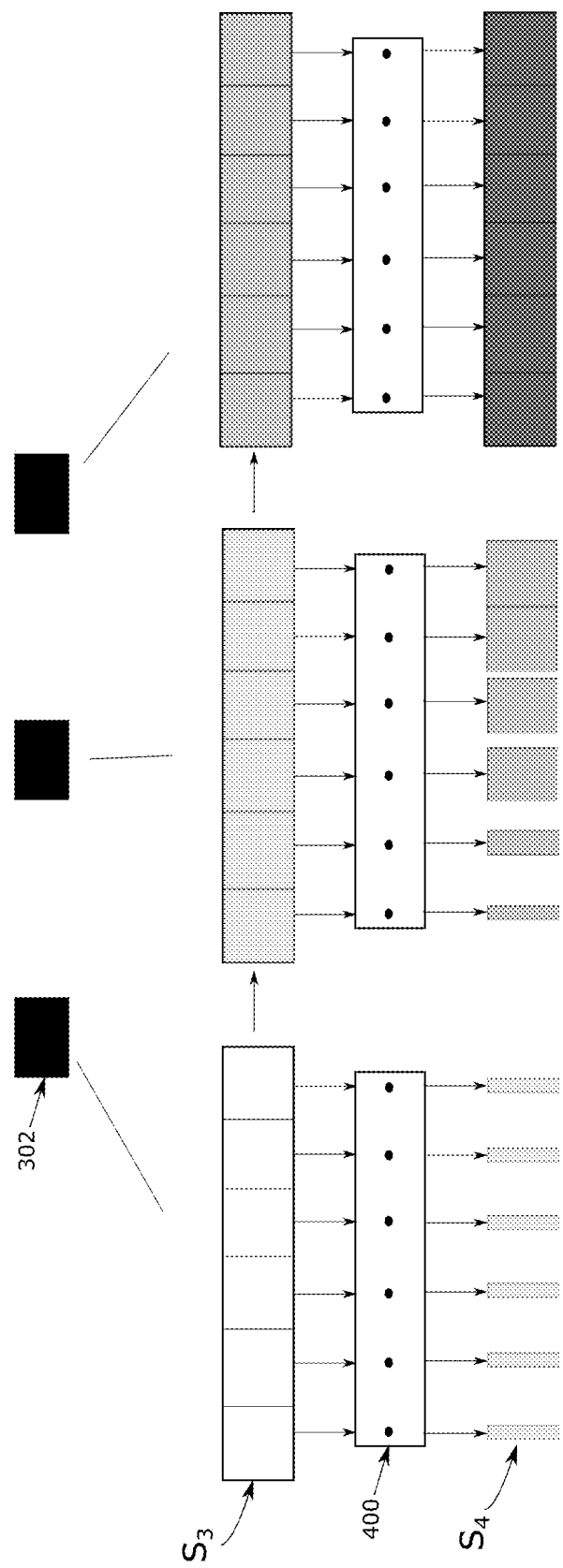
FIG. 5 shows another embodiment of the method.

FIG. 5 shows another embodiment of the method. In the example of FIG. 5 the method comprises processing a set of sub-images 302, as discussed above. For the first sub-image (starting from the left), the second dwell period for each second scan location may be shorter than the average segmentation dwell period. Again, this is illustrated by the length of the corresponding individual boxes of S3 and S4. Thus, the total amount of time for determining the second scan locations of the first sub-image may be longer than the total amount of time for detecting the X-rays from the respective second scan locations. As a result, the X-ray acquisition may remain idle for a certain period of time till it can be applied to the second sub-image, i.e. the new batch of second scan locations. For the second sub-image, the method comprises increasing the second dwell period for every second scan location, until it matches the average segmentation dwell period (illustrated by the increasing length of the individual boxes for S4). Consequently, for the third sub-image, the second dwell period may be matching 100% to the average segmentation dwell period at every second scan location of the corresponding data set 400. The X-ray detection may no longer be idle and may be applied with no delay to the upcoming sub-images. This method increases the number of X-ray photons detected at every second scan location. Consequently, this allows for a more precise reconstruction of each spectrum, thus leading to a higher accuracy/confidence in mineral classification. This in turn may lead to a reduction of the sampled area and thus to a higher overall acquisition throughput.

Figure 6:
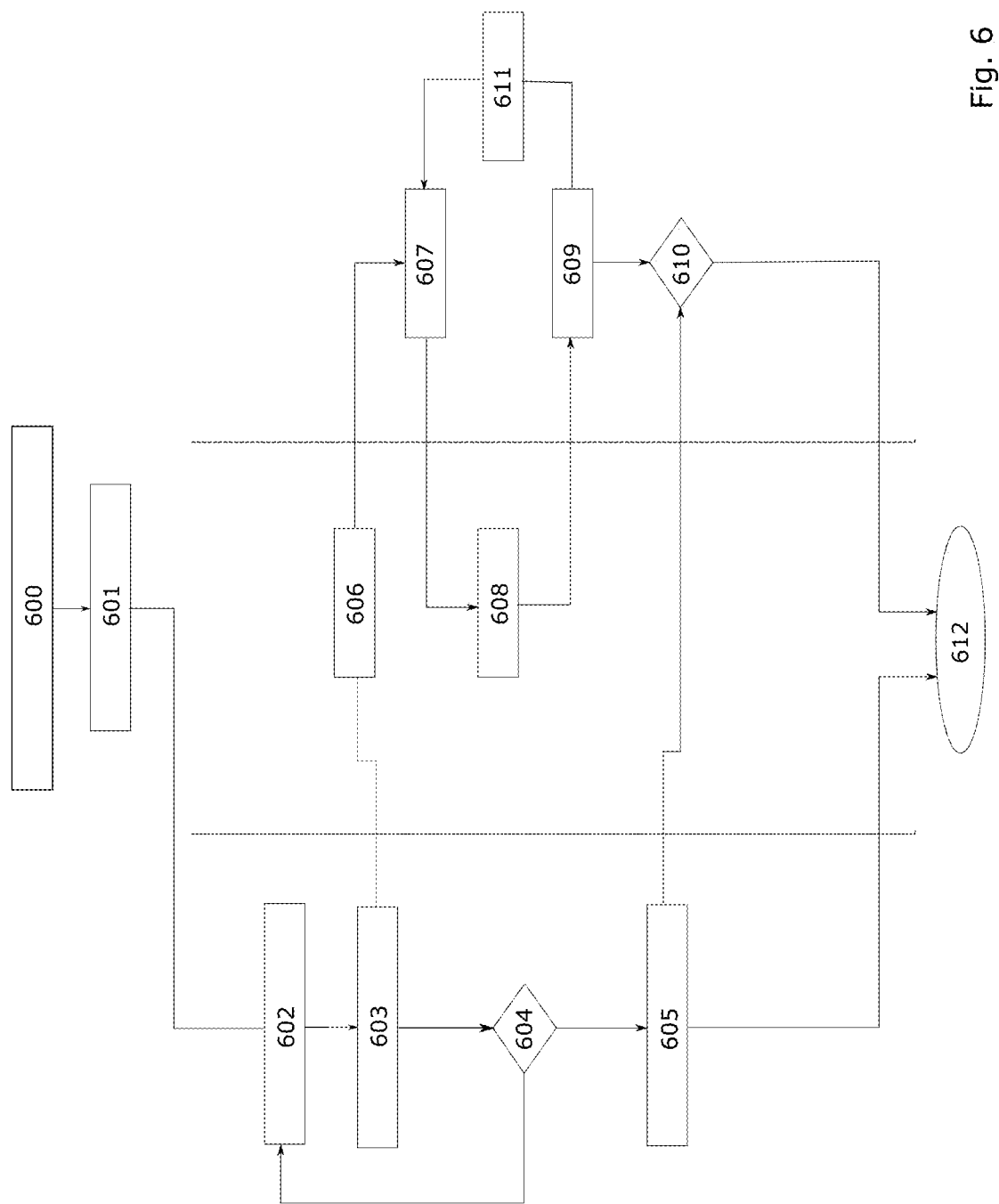
FIG. 6 shows a flowchart depicting an alternative embodiment of the method.

FIG. 6 shows a flowchart of an alternative embodiment of the method.

The method may comprise step 600, wherein step 600 comprises providing at least one image. In this example the image is a backscattered electron image. The method may also comprise step 601, wherein step 601 comprises dividing the at least one image into a plurality of sub-images. Each sub-image contains a region 301 of the at least one image, wherein a region 301 corresponds to a particle in the sample. Furthermore, the method may comprise step 602, wherein step 602 comprises selecting and segmenting one of the sub-images. Segmenting the one of the sub-images comprises identifying parts within the respective region by means of a contouring algorithm and a flood fill algorithm. The method may also comprise step 603, wherein step 603 comprises generating one second scan location for each part and thus, one or more second scan locations for each region. A part corresponds to a mineral grain of the corresponding particle. The method may further comprise step 606, wherein step 606 comprises storing the coordinates of the second scan location(s) of the respective sub-image as intermediate results in a data set. The method may also comprise step 607, wherein step 607 comprises receiving the data set as an input for the X-ray detection. The method may then perform step 608, wherein step 608 may comprise selecting the second scan locations of the respective data set in a sequential manner. The method may also comprise step 609, wherein step 609 may comprise detecting the X-ray emissions from the second scan locations of the respective data set sequentially. Furthermore, the method may comprise a decision block 610, wherein the decision block 610 may comprise determining whether or not all the data sets have been selected for the X-ray acquisition. If not, the method may comprise selecting another data set in step 607. However, before selecting another data set of second scan locations, the method may comprise step 611, wherein step 611 may correspond to a dwell period adjustment step. The dwell period adjustment step may comprise adjusting the second dwell period of the X-ray detection with the respect to an average segmentation dwell period. In this example, the average segmentation dwell period is determined based on sample statistics of preceding mineral grains relating to the one of the sub-images. Moreover, the method may also comprise a decision block 604, wherein the decision block may comprise determining whether or not all sub-images have been selected and processed. If not, the method may comprise selecting another sub-image in step 602. If all sub-images have been selected and processed, the method performs step 605, wherein step 605 comprises sending a notification to the decision block 610, wherein the notification comprises marking the end of the segmentation process. In this case, the decision block 610 determines that the second scan locations from all data sets have been selected for X-ray acquisition. Consequently, the method performs step 612, wherein step 612 comprises ending the overall process of segmentation and X-ray acquisition. The segmentation step may comprise steps 602 and 603. The detection step may comprise step 609. Steps 606 and 608 may comprise establishing a balancing queue of second scan locations between the segmentation step and the detection step. Moreover, the method may comprise performing the segmentation step in a first time interval and the detection step in a second time interval, wherein the first time interval and the second time interval may overlap. Thus, the method may comprise performing the segmentation step and the detection step in parallel.

Figure 7:
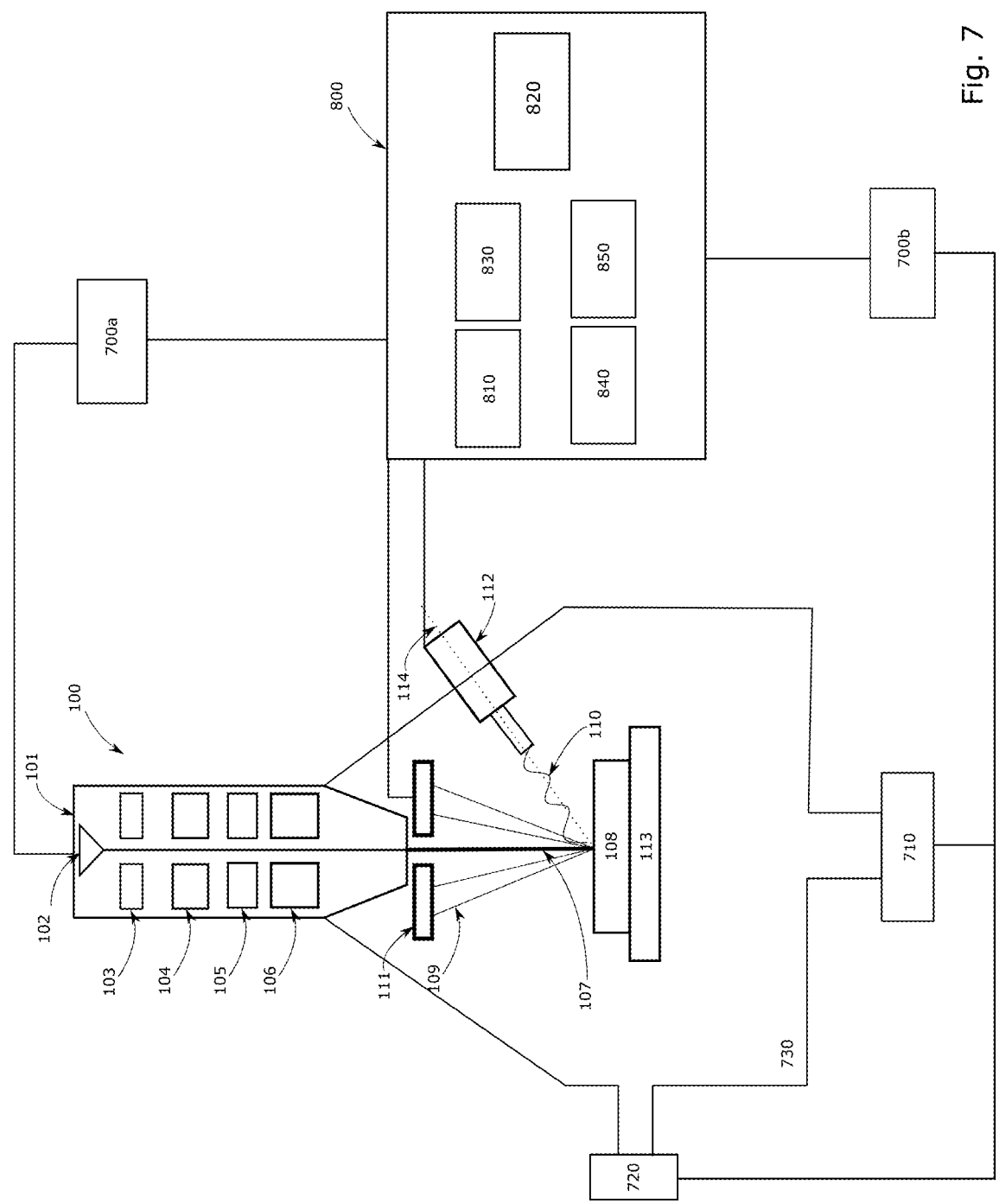
FIG. 7 shows a system configured for performing the method.

FIG. 7 shows a system. The system may be configured for performing the method.

The system comprises the scanning microscope system 100 and a data-processing system 800.

The data-processing system 800 may comprise one or more processing units configured to carry out computer instructions of a program (i.e. machine readable and executable instructions). The processing unit(s) may be singular or plural. For example, the data-processing system 800 may comprise at least one of CPU, GPU, DSP, APU, ASIC, ASIP or FPGA. In this example, the processing unit(s) may be configured for forming the X-ray spectrum based on the detected X-rays. In particular, in case of the EDS modality, the processing unit(s) may be configured for counting and sorting the detected X-rays (at each second scan location) based on the energies of the respective X-rays for the duration of the second dwell period. However, in case of the WDS modality, the processing unit(s) may be configured for counting and sorting the detected X-rays based on the wavelengths of the respective X-rays during the second dwell period.

The data-processing system 800 may comprise memory components, such as the data-storage component 810. The data-storage component 810 as well as the data-processing system 800 may comprise at least one of main memory (e.g. RAM), cache memory (e.g. SRAM) and/or secondary memory (e.g. HDD, SDD).

The data-processing system 800 may comprise volatile and/or non-volatile memory such an SDRAM, DRAM, SRAM, Flash Memory, MRAM, F-RAM, or P-RAM. The data-processing system 800 may comprise internal communication interfaces (e.g. busses) configured to facilitate electronic data exchange between components of the data-processing system 800, such as, the communication between the memory components and the processing components.

The data-processing system 800 may comprise external communication interfaces configured to facilitate electronic data exchange between the data-processing system and devices or networks external to the data-processing system. In the example of FIG. 7, the external communication interfaces may be configured for facilitating an electronic connection between the processing components of the data-processing system 800 and components of the scanning microscope system 100, such as the control unit 700*a*. Moreover, the external communication interfaces may be configured for establishing an electronic data exchange between the processing components of the data-processing system 800 and the vacuum controller 700*b*.

Furthermore, the external communication interfaces may also be configured for establishing an electronic data exchange between the data-processing system 800 and the first detector 111. The external communication interfaces may also be configured for facilitating an electronic connection between the data-processing system 800 and the second detector 112. For example, the detected backscattered electron data from every first scan location may be stored in the data-storage component 810. The processing unit(s) of the data-processing system 800 may be configured for forming the at least one image based on the stored backscattered electron data.

The backscattered electron image of the sample and the X-ray spectrum from each second scan location may be stored in the data-storage component 810.

The data-processing system may also comprise network interface card(s) that may be configured to connect the data-processing system to a network, such as, to the Internet. The data-processing system may be configured to transfer electronic data using a standardized communication protocol. The data-processing system may be a centralized or distributed computing system.

The data-processing system may comprise user interfaces, such as an output user interface and/or an input user interface. For example, the output user interface may comprise screens and/or monitors configured to display visual data (e.g. a backscattered electron image of the sample or an X-ray spectrum) or speakers configured to communicate audio data (e.g. playing audio data to the user). The input user interface may e.g. a keyboard configured to allow the insertion of text and/or other keyboard commands (e.g. allowing the user to enter instructions to the scanning microscope system or parameters for the method) and/or a trackpad, mouse, touchscreen and/or joystick, e.g. configured for navigating the backscattered electron image or regions identified in the backscattered electron image.

To put it simply, the data-processing system 800 may be a processing unit configured to carry out instructions of a program. The data-processing system 800 may be a system-on-chip comprising processing units, memory components and busses. The data-processing system 800 may be a personal computer, a laptop, a pocket computer, a smartphone, a tablet computer. The data-processing system may comprise a server, a server system, a portion of a cloud computing system or a system emulating a server, such as a server system with an appropriate software for running a virtual machine. The data-processing system may be a processing unit or a system-on-chip that may be interfaced with a personal computer, a laptop, a pocket computer, a smartphone, a tablet computer and/or user interfaces (such as the upper-mentioned user interfaces).

In the example of FIG. 7, the data-processing system comprises a segmentation component 820 configured for performing the segmentation step.

In other words, the data-processing system 800 may comprise a segmentation component 820. More particularly, the data-processing system 800 may comprise at least one storage device wherein the data-processing system 800 may be stored.

The segmentation component 820 may be implemented in software. Thus, the segmentation component 820 may be a software component, or at least a portion of one or more software components. The data-processing system 800 may be configured for running said software component, and/or for running a software comprising this software component. In other words, the segmentation component 820 may comprise one or more computer instructions (i.e. machine-readable instructions) which may be executed by a computer (e.g. the data-processing system 800).

The segmentation component 820 may be stored on one or more different storage devices. For example, the segmentation component 820 may be stored on a plurality of storage components comprising persistent memory, for example a plurality of storage devices in a RAID-system, or different types of memory, such as persistent memory (e.g. HDD, SDD, flash memory) and main memory (e.g. RAM).

The segmentation component 820 may also be implemented at least partially in hardware. For example, the segmentation component 820 or at least a portion of the segmentation component 820 may be implemented as a programmed and/or customized processing unit, hardware accelerator, or a system-on-chip that may be interfaced with the data-processing system 800, a personal computer, a laptop, a pocket computer, a smartphone, a tablet computer and/or a server.

The segmentation component 820 may also comprise elements implemented in hardware and elements implemented in software. An example may be a use of a hardware-implemented encryption/decryption unit and a software implemented processing of the decrypted data.

Further, the data-processing system 800 may comprise an comprise a dwell period adjustment component 830. The dwell period adjustment component 830 may be configured for performing the dwell period adjustment step. More particularly, the data-processing system 800 may comprise at least one storage device wherein the dwell period adjustment component 830 may be stored.

Also, the data-processing system 800 may comprise a pre-processing component 840. The pre-processing component 840 may be configured for performing the pre-processing step.

The data-processing system 800 may also comprise a post-processing component 850. The post-processing component 850 may be configured for performing the post-processing step.

The data-processing system 800 may comprise at least one storage device wherein at least one of the dwell period adjustment component 830, the pre-processing component 840 and the post-processing component 850 may be stored, such as the data-storage component 810.

At least one of the dwell period adjustment component 830, the pre-processing component 840 and the post-processing component 850 may be implemented in software. One, some or all of these components may be a software component, or at least a portion of one or more software components. The data-processing system 800 may be configured for running said software components, and/or for running a software comprising the software components. In other words, the components may comprise one or more computer instructions (i.e. machine-readable instructions) which may be executed by a computer (e.g. the data-processing system 800).

At least one of the dwell period adjustment component 830, the pre-processing component 840 and the post-processing component 850 may be stored on one or more different storage devices. For example, the at least one of the components may be stored on a plurality of storage components comprising persistent memory, for example a plurality of storage devices in a RAID-system, or different types of memory, such as persistent memory (e.g. HDD, SDD, flash memory) and main memory (e.g. RAM).

The components may also be implemented at least partially in hardware. For example, at least one of the dwell period adjustment component 830, the pre-processing component 840 and the post-processing component 850 or at a part of one of their functionalities may be implemented as a programmed and/or customized processing unit, hardware accelerator, or a system-on-chip that may be interfaced with the data-processing system 800, a personal computer, a laptop, a pocket computer, a smartphone, a tablet computer and/or a server.

While in the above, a preferred embodiment has been described with reference to the accompanying drawings, the skilled person will understand that this embodiment was provided for illustrative purpose only and should by no means be construed to limit the scope of the present invention, which is defined by the claims.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

REFERENCE SIGNS 100 scanning microscope system
101 scanning electron microscope
102 electron source
103 anode
104 condensing lens
105 scanning coil
106 objective lens
107 electron beam
108 sample
109 first emissions
110 second emissions
111 first detector
112 second detector
113 movable stage
114 center line of the second detector
200 particle
201 epoxy matrix
202 first scan location
203 dashed line
300 image
301 region
302 sub-image
303 mask
304 second scan location
305 spectrum
306 spectral line
400 data set of second scan locations
S1 image providing step
S2 sub-image generation step
S3 segmentation step
S4 detection step
600-612 steps of a method embodiment shown in flowchart of FIG. 6
700a control unit
700b vacuum controller
710 mechanical pumping system
720 ultra-high vacuum pump
730 vacuum chamber
800 data-processing system
810 data-storage component
820 segmentation component
830 dwell period adjustment component
840 pre-processing component
850 post-processing component

The invention claimed is:

1. A system configured for material analysis and mineralogy, comprising a scanning microscope system, the scanning microscope system comprising a first detector and a second detector, and further comprising a data-processing system, the data-processing system comprising a data-storage component, a segmentation component and a dwell period adjustment component,
wherein the data-storage component is configured for performing an image providing step, comprising providing at least one image of a sample based on first emissions from a plurality of first scan locations, wherein the first emissions are detected for a duration time of a first dwell period at each first scan location, wherein the segmentation component is configured for performing a segmentation step, comprising determining at least one or a plurality of second scan locations for at least one or a plurality of region(s) of the at least one image, wherein each second scan location is determined for a duration time of a segmentation dwell period, wherein the second detector is configured for performing a detection step, comprising detecting second emissions from at least one of the second scan locations of at least one of the regions, wherein the second emissions are detected for a duration time of a second dwell period at each second scan location, wherein the dwell period adjustment component is configured for performing a dwell period adjustment step, comprising adjusting the second dwell period with respect to an average segmentation dwell period.

2. The system according to claim 1, wherein the scanning microscope system is configured for focusing a beam of charged particles to a scan point on the sample and/or is configured for scanning the beam of charged particles over a plurality of scan locations in one or two dimensions, wherein the scan locations correspond to the first scan locations and/or the second scan locations.

3. The system according to claim 1, wherein the scanning microscope system is configured for generating the first emissions and the second emissions.

4. The system according to claim 1, wherein the dwell period adjustment component is further configured to determine the average segmentation dwell period based on statistics of the sample.

5. The system according to claim 1, wherein the data-processing system is configured for generating the at least one image based on the first emissions detected at each first scan location, and/or the at least one image corresponds to a backscattered electron image.

6. The system according to claim 1, wherein the data-processing component comprises a pre-processing component, wherein the pre-processing component is configured for dividing the at least one image into at least two or a plurality of sub-images, wherein a sub-image of the at least one image is delimiting one region relating to a particle in the.

7. The system according to claim 1, wherein the segmentation dwell period is longer than the second dwell period.

8. The system according to claim 1, wherein the dwell period adjustment component is configured for generating an adjusted second dwell period, wherein the adjusted second dwell period is equal to the average segmentation dwell period.

9. The system according to claim 1, wherein the data-processing system further comprises a post-processing component, wherein the post-processing component is configured for generating at least one spectrum based on the second emissions from the at least one of the second scan locations of the at least one of the regions, wherein the at least one spectrum corresponds to an X-ray spectrum.

10. A method for determining properties of a sample, comprising:

performing an image providing step, comprising providing at least one image of the sample based on first emissions from a plurality of first scan locations, wherein the first emissions are detected for a duration time of a first dwell period at each first scan location;

performing a segmentation step, comprising determining at least one or a plurality of second scan location(s) for at least one or a plurality of regions of the at least one image, wherein each second scan location is determined for a duration time of a segmentation dwell period;

performing a detection step, comprising detecting second emissions from at least one of the second scan locations of at least one of the regions, wherein the second emissions are detected for a duration time of a second dwell period at each second scan location; and performing a dwell period adjustment step, comprising adjusting the second dwell period with respect to an average segmentation dwell period.

11. The method according to claim 10, wherein the method further comprises focusing a beam of charged particles to a scan point on the sample and/or scanning the beam of charged particles over a plurality of scan locations in one or two dimensions, wherein the scan locations correspond to the first scan locations and/or the second scan locations.

12. The method according to claim 10, wherein the method further comprises generating the first emissions and the second emissions.

13. The method according to claim 10, further comprising determining the average segmentation dwell period based on statistics of the sample.

14. The method according to claim 10, wherein the method comprises generating the at least one image based on the first emissions detected at each first scan location, and/or the at least one image corresponds to a backscattered electron image.

15. The method according to claim 10, wherein the method further comprises a pre-processing step, wherein the pre-processing step comprises dividing the at least one image into at least two or a plurality of sub-images, wherein a sub-image of the at least one image is delimiting one region relating to a particle in the sample.

16. The method according to claim 10, wherein the segmentation dwell period is longer than the second dwell period.

17. The method according to claim 10, wherein the dwell period adjustment step comprises generating an adjusted second dwell period, wherein the adjusted second dwell period is equal to the average segmentation dwell period.

18. The method according to claim 10, wherein the method further comprises a post-processing step, wherein the post-processing step comprises generating at least one spectrum based on the second emissions from the at least one of the second scan locations of the at least one of the regions, wherein the at least one spectrum corresponds to an X-ray spectrum.

19. A computer program product comprising instructions which, when the program is executed by a computer of a scanning microscope system, cause the scanning microscope system to carry out the steps of the method according to claim 10.

20. The method according to claim 13, wherein the statistics of the sample includes one or more of a particle size, a grain number per particle, a size distribution of the at least some preceding mineral grains and/or particles over the sample.

21. The method according to claim 13, wherein the statistics of the sample includes statistics of least some preceding mineral grains and/or particles of the sample.

* * * * *